US012573431B1

(12) United States Patent
Parish et al.

(10) Patent No.: US 12,573,431 B1
(45) Date of Patent: Mar. 10, 2026

(54) APPARATUS AND METHOD FOR GENERATING AN AUTOMATED CONFIGURATION AS A FUNCTION OF DETERMINING A MEDIA SOURCE

(71) Applicant: Studio ME IP, LLC, Pittsburgh, PA (US)

(72) Inventors: Keith Parish, Pittsburgh, PA (US); Joseph Leachko, Pittsburgh, PA (US)

(73) Assignee: Studio ME IP, LLC, Pittsburgh, PA (US)

( * ) Notice: Subject to any disclaimer, the term of this patent is extended or adjusted under 35 U.S.C. 154(b) by 0 days.

(21) Appl. No.: 19/303,555

(22) Filed: Aug. 19, 2025

(51) Int. Cl.
| | |
|---|---|
| *G11B 27/10* | (2006.01) |
| *G10L 15/02* | (2006.01) |
| *G10L 15/06* | (2013.01) |
| *G10L 15/18* | (2013.01) |
| *G10L 15/183* | (2013.01) |
| *G10L 25/57* | (2013.01) |
| *G11B 27/031* | (2006.01) |

(52) U.S. Cl.
CPC .............. *G11B 27/10* (2013.01); *G10L 15/02* (2013.01); *G10L 15/063* (2013.01); *G10L 15/1815* (2013.01); *G10L 15/1822* (2013.01); *G10L 15/183* (2013.01); *G10L 25/57* (2013.01); *G11B 27/031* (2013.01)

(58) Field of Classification Search
CPC ....... G11B 27/10; G11B 27/031; G10L 15/02; G10L 15/063; G10L 15/1815; G10L 15/1822; G10L 15/183; G10L 25/57
USPC ....................................................... 386/201
See application file for complete search history.

(56) References Cited

U.S. PATENT DOCUMENTS

| | | | | |
|---|---|---|---|---|
| 11,468,886 B2 * | 10/2022 | Kim | .................... | G10L 21/0272 |
| 12,413,904 B2 * | 9/2025 | Nighman | ................ | G10L 25/78 |
| 2003/0112983 A1 * | 6/2003 | Rosca | .................... | H04R 3/005 |
| | | | | 381/103 |
| 2016/0336043 A1 | 11/2016 | Janszen | | |
| 2019/0320281 A1 | 10/2019 | Guo et al. | | |
| 2025/0055942 A1 * | 2/2025 | Nighman | .............. | H04M 3/568 |
| 2025/0324198 A1 * | 10/2025 | Wilberding | ............ | H04R 27/00 |

FOREIGN PATENT DOCUMENTS

| | | |
|---|---|---|
| CN | 109285568 A | 1/2019 |
| IN | 202421080425 A | 1/2025 |
| WO | 2023216119 A1 | 11/2023 |

* cited by examiner

*Primary Examiner* — Helen Shibru
(74) *Attorney, Agent, or Firm* — CALDWELL LLC

(57) ABSTRACT

An apparatus and method for generating an output media file as a function of determining a media source. The apparatus includes at least an audio input device configured to detect at least an audio signal and convert the at least an audio signal into an electronic signal, and at least a processor communicatively connected to a memory, the processor configured to identify, using a first model, one or more engaged devices based on sensor data, receive input data, filter the input data based on a signal level and a context datum of the at least an electronic signal, and determine, using a second model, a key audio source as a function of the one or more engaged devices and the filtered input data, generate, using a virtual director, an output media file as a function of the key audio source, and present the output media file.

20 Claims, 9 Drawing Sheets

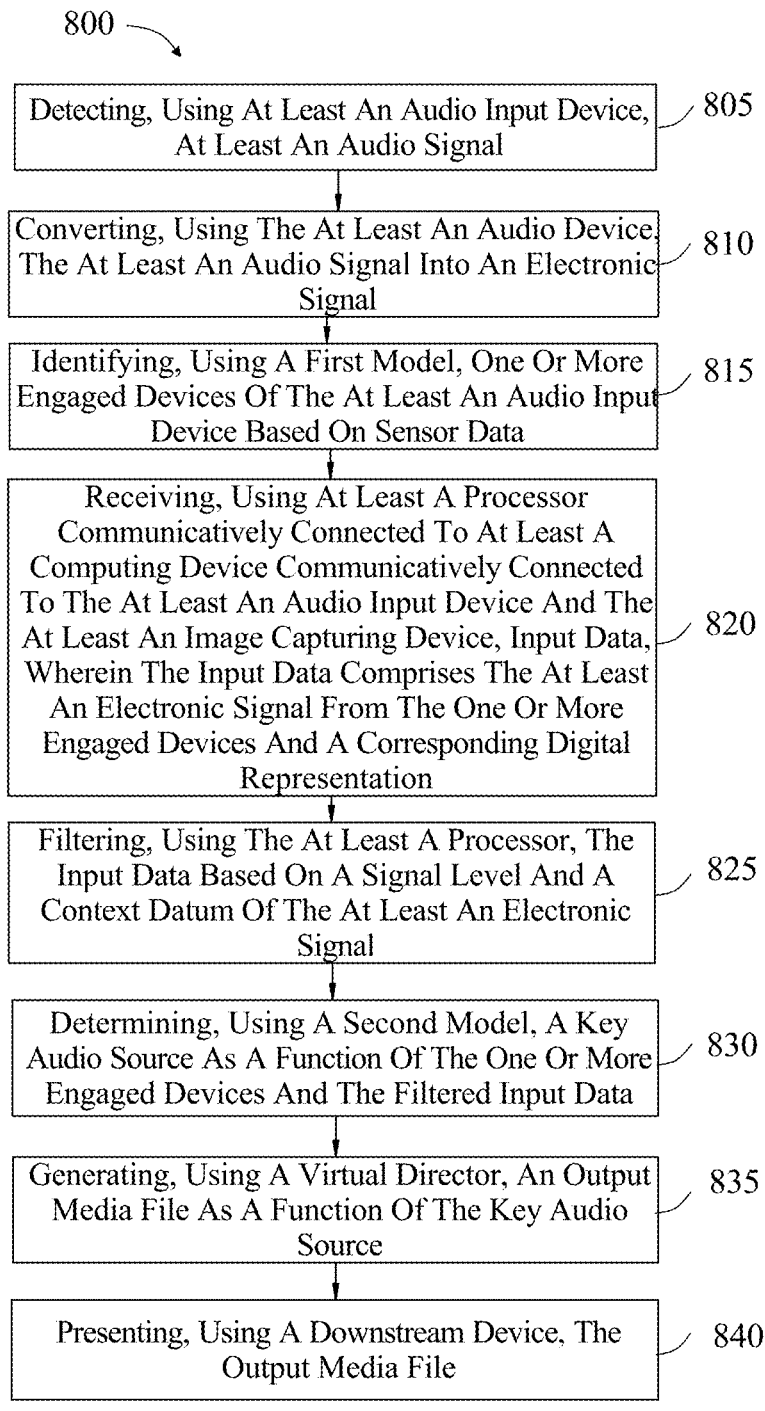

800 ⎯⬎

Detecting, Using At Least An Audio Input Device, At Least An Audio Signal — 805

Converting, Using The At Least An Audio Device, The At Least An Audio Signal Into An Electronic Signal — 810

Identifying, Using A First Model, One Or More Engaged Devices Of The At Least An Audio Input Device Based On Sensor Data — 815

Receiving, Using At Least A Processor Communicatively Connected To At Least A Computing Device Communicatively Connected To The At Least An Audio Input Device And The At Least An Image Capturing Device, Input Data, Wherein The Input Data Comprises The At Least An Electronic Signal From The One Or More Engaged Devices And A Corresponding Digital Representation — 820

Filtering, Using The At Least A Processor, The Input Data Based On A Signal Level And A Context Datum Of The At Least An Electronic Signal — 825

Determining, Using A Second Model, A Key Audio Source As A Function Of The One Or More Engaged Devices And The Filtered Input Data — 830

Generating, Using A Virtual Director, An Output Media File As A Function Of The Key Audio Source — 835

Presenting, Using A Downstream Device, The Output Media File — 840

FIG. 8

APPARATUS AND METHOD FOR GENERATING AN AUTOMATED CONFIGURATION AS A FUNCTION OF DETERMINING A MEDIA SOURCE

FIELD OF THE INVENTION

The present invention generally relates to the field of artificial intelligence. In particular, the present invention is directed to an apparatus and a method for generating an output media file as a function of determining a key audio source.

BACKGROUND

Many media production systems rely on manual configuration of audio and video sources, which can introduce inefficiencies, inconsistencies, or missed cues during live or recorded sessions. In typical multi-speaker podcasting or other live-recording environments, accurately identifying the primary speaker or relevant audio stream in real time remains a technical challenge, particularly when multiple microphones or ambient noise are present. Moreover, coordinating audio and video transitions in a coherent and contextually appropriate manner often requires post-production editing by a skilled human operator, adding time, cost, and variability to the final output media file.

SUMMARY OF THE DISCLOSURE

In an aspect, an apparatus for generating an output media file as a function of determining a key audio source includes at least an audio input device configured to detect at least an audio signal and convert the at least an audio signal into an electronic signal, and at least a computing device communicatively connected to the at least an audio input device, wherein the computing device comprises a memory and at least a processor communicatively connected to the memory, wherein the memory contains instructions configuring the at least a processor to identify, using a first model, one or more engaged devices of the at least an audio input device based on sensor data, receive, using the at least a processor, input data, wherein the input data comprises the at least an electronic signal from the one or more engaged devices, filter, using the at least a processor, the input data based on a signal level and a context datum of the at least an electronic signal, and determine, using a second model, a key audio source as a function of the one or more engaged devices and the filtered input data, generate, using a virtual director, an output media file as a function of the key audio source, and present, using a downstream device, the output media file.

In another aspect, a method for generating an output media file as a function of determining a key audio source includes detecting, using at least an audio input device, at least an audio signal, converting, using the at least an audio device, the at least an audio signal into an electronic signal, identifying, using a first model, one or more engaged devices of the at least an audio input device based on sensor data, receiving, using at least a processor communicatively connected to at least a computing device communicatively connected to the at least an audio input device and the at least an image capturing device, input data, wherein the input data comprises the at least an electronic signal from the one or more engaged devices and a corresponding digital representation, filtering, using the at least a processor, the input data based on a signal level and a context datum of the at least an electronic signal, and determining, using a second model, a key audio source as a function of the one or more engaged devices and the filtered input data, generating, using a virtual director, an output media file as a function of the key audio source, and presenting, using a downstream device, the output media file.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 8 is a block diagram of an exemplary method for generating an output media file as a function of determining a key audio source.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for generating an output media file as a function of determining a key audio source. The apparatus includes at least a computing device comprised of a processor and a memory communicatively connected to the processor. The memory instructs the processor to identify, using a first model, one or more engaged devices of the at least an audio input device based on sensor data. The processor receives input data, wherein the input data comprises the at least an electronic signal from the one or more engaged devices. The processor filters the input data based on a signal level and a context datum of the at least an electronic signal. Additionally, the processor determines, using a second model, a key audio source as a function of the one or more engaged devices and the filtered input data. The processor generates, using a virtual director, an output media file as a function of the key audio source. The memory then instructs the processor to present, using a downstream device, the output media file.

Figure 1:
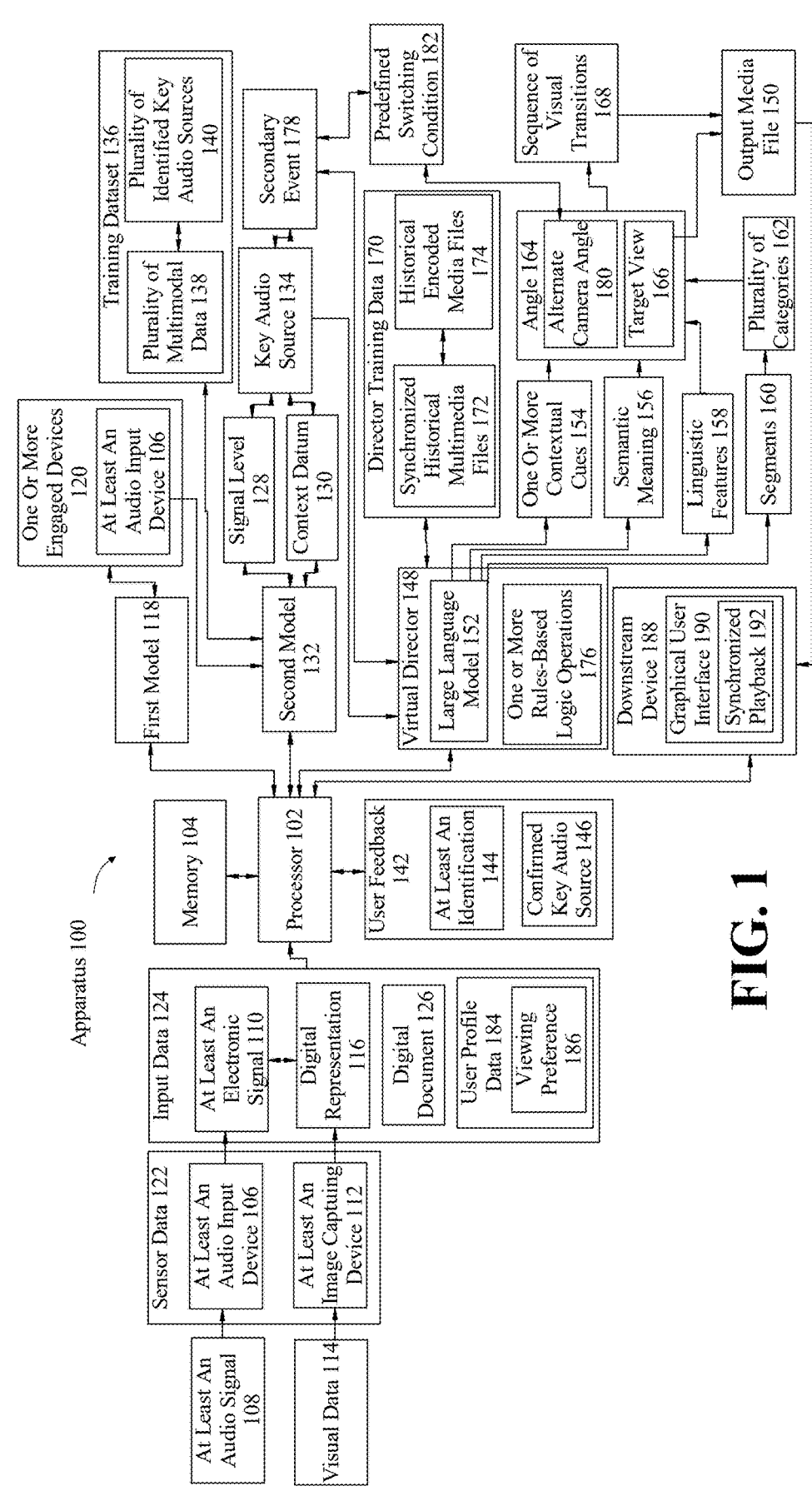
FIG. 1 is a block diagram of an apparatus for generating an output media file as a function of determining a key audio source.

Referring now to FIG. 1, an exemplary embodiment of apparatus 100 for generating an output media file as a function of determining a key audio source is illustrated. Apparatus 100 may include a processor 102 communicatively connected to a memory 104. As used in this disclosure, "communicatively connected" means connected by way of a connection, attachment, or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 104 may include a primary memory and a secondary memory. "Primary memory" also known as "random access memory" (RAM) for the purposes of this disclosure is a short-term storage device in which information is processed. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor 102 may access the information from primary memory.

Still referring to FIG. 1, apparatus 100 may include a database. The database may include a remote database. The database may be implemented, without limitation, as a relational database, a key-value retrieval database such as a NOSQL database, or any other format or structure for use as database that a person skilled in the art would recognize as suitable upon review of the entirety of this disclosure. The database may alternatively or additionally be implemented using a distributed data storage protocol and/or data structure, such as a distributed hash table or the like. The database may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, apparatus 100 may include and/or be communicatively connected to a server, such as but not limited to, a remote server, a cloud server, a network server and the like. In one or more embodiments, the computing device may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by the apparatus computing device. In one or more embodiments, computing device may transmit processes to server wherein computing device may conserve power or energy.

Further referring to FIG. 1, apparatus 100 may include any "computing device" as described in this disclosure, including without limitation a microcontroller, microprocessor, digital signal processor (DSP) and/or system on a chip (SoC) as described in this disclosure. Apparatus 100 may include, be included in, and/or communicate with a mobile device such as a mobile telephone or smartphone. Apparatus 100 may include a single computing device operating independently, or may include two or more computing devices operating in concert, in parallel, sequentially or the like; two or more computing devices may be included together in a single computing device or in two or more computing devices. Apparatus 100 may interface or communicate with one or more additional devices as described below in further detail via a network interface device. Network interface device may be utilized for connecting processor 102 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 102 may include but is not limited to, for example, a computing device or cluster of computing devices in a first location and a second computing device or cluster of computing devices in a second location. Apparatus 100 may include one or more computing devices dedicated to data storage, security, distribution of traffic for load balancing, and the like. Apparatus 100 may distribute one or more computing tasks as described below across a plurality of computing devices of computing device, which may operate in parallel, in series, redundantly, or in any other manner used for distribution of tasks or memory between computing devices. Apparatus 100 may be implemented, as a non-limiting example, using a "shared nothing" architecture.

With continued reference to FIG. 1, processor 102 may be designed and/or configured to perform any method, method step, or sequence of method steps in any embodiment described in this disclosure, in any order and with any degree of repetition. For instance, processor 102 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 102 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, apparatus 100 includes at least an audio input device 106 configured to detect at least an audio signal 108 and convert the at least an audio signal 108 into an electronic signal 110. As used in this disclosure, an "audio input device" is a hardware component or system configured to capture sound waves from a surrounding environment and convert them into a format suitable for electronic processing. The audio input device 106 may include, without limitation, a microphone, microphone array, headset mic, lavalier mic, boom mic, or an integrated microphone within a computing device. In a non-limiting example, the audio input device 106 may comprise a high-fidelity condenser microphone used by a host of a live-recording environment to capture studio-quality voice recordings. In a non-limiting example, the audio input device 106 may include a directional shotgun microphone configured to isolate speech from a single speaker during a multi-person interview. In a non-limiting example, the audio input device 106 may be part of a Bluetooth-enabled headset that wirelessly transmits speech from a remote participant into the system. In a non-limiting example, the audio input device 106 may include a dual-mic array integrated into a smartphone, capturing both ambient sound and close-range voice. In a non-limiting example, the audio input device 106 may be mounted on a camera rig, allowing simultaneous capture of visual and auditory inputs during a video podcast recording or other live-recording environment recording. As used in this disclosure, an "audio signal" is a representation of sound energy as a time-varying analog waveform that encodes acoustic information. Acoustic information may include, without limitation, voice, music, ambient noise, and the like. The audio signal 108 may originate from mechanical vibrations in the air. The audio signal 108 may be captured by an audio input device 106 prior to conversion into digital form. In a non-limiting example, the audio signal 108 may include the live speech of a podcast host introducing an episode. In a non-limiting example, the audio signal 108 may comprise background conversation and environmental sounds recorded during a street interview. In a non-limiting example, the audio signal 108 may contain the acoustic output of a musical jingle played at the beginning or end of a podcast or other live-recording environment. In a non-limiting example, the audio signal 108 may include audience reactions, such as clapping or laughter, captured during a live panel discussion. In a non-limiting example, the audio signal 108 may represent ambient room noise, which may later be filtered out by signal processing algorithms. As used in this disclosure, an "electronic signal" is a voltage-based or current-based representation of an audio signal 108 that has been transformed by the audio input device 106 into an analog or digital electrical format. In an embodiment, the electrical format may be suitable for processing by a computing device. Without limitation, the electronic signal 110 may be used for further analysis, encoding, filtering, or output generation. In a non-limiting example, the electronic signal 110 may be a digitized voice stream sent to a processor 102 for transcription during a live recording. In a non-limiting example, the electronic signal 110 may represent amplitude variations of a vocal track, used by a virtual director 148 to identify the primary speaker. In a non-limiting example, the electronic signal 110 may be analyzed by a signal filter to remove noise prior to generating the final podcast episode. In a non-limiting example, the electronic signal 110 may be used as input for a machine learning model to determine emotional tone or speaker intent. In a non-limiting example, the electronic signal 110 may be transmitted over a network to synchronize remote podcast participants during a multi-location session.

With continued reference to FIG. 1, in a non-limiting example, the audio input device 106 may comprise a podcast host's USB microphone configured to detect the host's voice as an audio signal 108 during a solo recording session and convert it into an electronic signal 110 for downstream waveform visualization and real-time monitoring. In a non-limiting example, the audio input device 106 may include a wireless lavalier microphone clipped to a guest's clothing during a video podcast or other live-recording environment video, where the device detects the guest's speech and transmits an electronic signal 110 to a computing device for synchronized encoding alongside visual data 114. In a non-limiting example, the audio input device 106 may comprise a boundary microphone positioned on a podcast studio table, capturing ambient dialogue from multiple speakers and converting the resulting audio signal 108 into an electronic signal 110 that is processed to isolate the dominant voice for segment classification.

With continued reference to FIG. 1, apparatus 100 may include at least an image capturing device 112 configured to record visual data 114 and generate a digital representation 116 of the visual data 114. As used in this disclosure, an "image capturing device" is a hardware component configured to record visual data 114 from a field of view and convert it into a format suitable for digital processing, transmission, or storage. The image capturing device 112 may include, without limitation, a webcam, DSLR camera, mirrorless camera, smartphone camera, or any video recording device integrated into a computing system. In a non-limiting example, the image capturing device 112 may include a webcam mounted on a desktop monitor recording the host of a video podcast. In a non-limiting example, the image capturing device 112 may include a tripod-mounted mirrorless camera used to record a multi-camera podcast setup in a studio. In a non-limiting example, the image capturing device 112 may be integrated into a smartphone used by a guest to join a podcast remotely via video call.

With continued reference to FIG. 1, as used in this disclosure, "visual data" is information derived from a captured scene that reflects observable physical features such as people, objects, motion, lighting, or background environments, typically in the form of a sequence of image frames. Visual data 114 may include, without limitation, live video footage, still images, or motion metadata. In a non-limiting example, the visual data 114 may include facial expressions and gestures of a podcast host recorded during a video session. In a non-limiting example, the visual data 114 may reflect a screen-shared presentation captured during a remote podcast interview. In a non-limiting example, the visual data 114 may capture camera transitions, guest reactions, and visual branding elements used during a recorded live stream.

With continued reference to FIG. 1, as used in this disclosure, a "digital representation" is an encoded or formatted version of visual data 114 that has been converted from analog image signals into a digitally processable form such as pixel arrays, video frames, or compressed media files. The digital representation 116 may be used for storage, editing, transmission, or further computational analysis. In a non-limiting example, the digital representation 116 may include a high-definition MP4 video file generated from the recorded camera feed of a podcast host. In a non-limiting example, the digital representation 116 may comprise a sequence of image frames stored in memory for editing transitions and overlays in post-production. In a non-limiting example, the digital representation 116 may be analyzed by a virtual director 148 to determine optimal visual cuts and camera angles during the encoding of the final media file.

With continued reference to FIG. 1, in a non-limiting example, the image capturing device 112 may include a high-definition webcam mounted on a monitor in front of a podcast host, wherein the webcam is configured to continuously record the host's facial expressions, gestures, and speaking posture during a live video podcast session. The visual data 114 captured by the webcam may include a series of image frames reflecting dynamic facial movements, lighting conditions, and physical interaction with a microphone or script. The image capturing device 112 may convert this visual data 114 into a digital representation 116, such as a compressed MP4 video stream or raw pixel data, which is transmitted to a computing device for synchronization with corresponding audio content. In a non-limiting example, the image capturing device 112 may include a studio-mounted DSLR camera with HDMI output, configured to record a wide-angle view of multiple speakers seated around a podcast table. The camera may detect variations in lighting, speaker movement, and background activity, and generate visual data 114 that is digitized and encoded in real time for preview and post-production editing. In a non-limiting example, the image capturing device 112 may comprise a smartphone camera used by a remote guest, configured to capture visual data 114 during a virtual interview. The smartphone may transmit a digital representation 116 of the video over a network connection, wherein the digital representation 116 is formatted in a resolution and frame rate suitable for integration into a multi-stream output media file 150. The image capturing device 112 may further support zoom, autofocus, and light correction features to enhance the clarity and framing of the recorded visual data 114, ensuring that the resulting digital representation 116 is suitable for downstream processing, such as camera angle 164 selection, visual transitions, or audience-facing playback.

Still referring to FIG. 1, processor 102 is configured to identify, using a first model 118, one or more engaged devices 120 of the at least an audio input device 106 based on sensor data 122. As used in this disclosure, a "first model" is a computational model that evaluates sensor data 122 from one or more audio input devices 106 and determines which of those devices should be activated for signal capture. In an embodiment, the computational model may be rule-based, statistical, and/or machine-learning. In an embodiment, the first model 118 may determine which audio input devices 106 should remain inactive. In an embodiment, the first model 118 may control real-time microphone engagement during a recording session. The first model 118 may be pre-trained or continuously updated based on real-world data, and may make activation decisions based on a variety of parameters, including voice detection confidence, spatial orientation, noise levels, or user-specific configurations. The first model 118 may operate at regular intervals or in response to a triggering condition, such as a new individual entering the recording area or a shift in dominant speech. In a non-limiting example, the first model 118 may detect that only two of four microphones in a room are receiving consistent voice input above a set decibel threshold and activate only those two microphones. In a non-limiting example, the first model 118 may monitor ambient noise and determine that a nearby fan is distorting the signal from one microphone, prompting it to deactivate that device. In a non-limiting example, the first model 118 may evaluate timestamped activation history and determine that a previously used microphone is no longer contributing signal and may be safely disengaged. In a non-limiting example, the first model 118 may use learned patterns to predict that a particular microphone should be preemptively activated when a person consistently begins speaking after a visual cue. In a non-limiting example, the first model 118 may process voice activity detection (VAD) signals across a microphone array and isolate the devices most relevant for clean signal capture.

With continued reference to FIG. 1, as used in this disclosure, an "engaged device" is an audio input device 106 that the first model 118 designates as active or turned on for capturing an audio signal 108 during a given time interval. Without limitation, a non-engaged device may remain inactive or muted until reclassified by the first model 118. In an embodiment, the engaged device 120 may be dynamically determined and reassigned throughout a recording session, depending on real-time input conditions. The designation of a device as "engaged" may optimize resource usage, minimize unwanted background noise, and streamline signal processing by focusing only on relevant data sources. In a non-limiting example, an engaged device 120 may be a directional microphone positioned near an individual currently speaking, which the first model 118 activates in response to consistent voice signals. In a non-limiting example, a handheld wireless microphone may become an engaged device 120 when motion data and sound input confirm it is being used. In a non-limiting example, a lavalier microphone may be classified as engaged for only part of the session when the wearer is actively participating. In a non-limiting example, a tabletop microphone may initially be disengaged, then automatically engaged when a second participant enters the room and begins speaking. In a non-limiting example, an engaged device 120 may be highlighted in the graphical user interface 190 for monitoring or manual override by a system operator. In some embodiments, the apparatus 100 may identify an engaged device 120 by using visual data 114 captured from the image capturing device 112 in combination with sensor data 122 from one or more audio input devices 106. The first model 118 may analyze the visual data 114 to detect the presence, movement, or behavior of one or more individuals within the frame, and correlate those observations with the spatial positioning or orientation of the available audio input devices 106. For example, the image capturing device 112 may provide facial detection, gaze direction, or lip movement data that indicates which individual is actively speaking. The model may further estimate proximity between individuals and nearby microphones based on their position within the frame and known spatial mappings of the recording setup. In a non-limiting example, the first model 118 may detect that an individual has turned toward a directional microphone and is visibly speaking, prompting the system to activate the corresponding device as an engaged audio input device 106. In a non-limiting example, the model may track body or head orientation to infer which microphone is most likely to capture high-fidelity audio and designate it as engaged. In another non-limiting example, the model may detect that one individual is gesturing or moving while others remain still, indicating active participation, and prioritize the microphone closest to that individual. The visual data 114 may be processed in real time or buffered and analyzed in short segments 160 to maintain responsiveness and accuracy in dynamic environments.

With continued reference to FIG. 1, as used in this disclosure, "sensor data" is information collected from one or more sensors that detect, measure, or monitor physical, environmental, or operational conditions. The sensor data 122 may include, for example, audio signals 108, visual data 114, motion detection, temperature readings, biometric indicators, electromagnetic signals, light intensity, pressure levels, proximity data, orientation, or any other type of detectable input capable of being converted into an electronic format for processing. The sensor data 122 may be processed individually or in combination to determine which audio input devices 106 should be activated or deactivated by the system. In a non-limiting example, the sensor data 122 may include infrared proximity readings used to determine the presence and relative location of individuals in a room. In a non-limiting example, the sensor data 122 may comprise motion detection signals from a camera that identify gestures or speaker activity near a particular microphone. In a non-limiting example, the sensor data 122 may include orientation and acceleration values from an inertial measurement unit (IMU) indicating that a handheld recording device has been repositioned. In a non-limiting example, the sensor data 122 may consist of visual frame analysis from an image capturing device 112 used to track gaze direction or body positioning. In a non-limiting example, the sensor data 122 may include ambient light measurements that affect how and when certain devices should be activated or prioritized for input capture.

With continued reference to FIG. 1, the at least a processor 102 may be further configured to activate the one or more engaged devices 120 of the at least an audio input device 106 identified using the first model 118, and deactivate one or more non-engaged audio input devices. As used in this disclosure, "non-engaged audio input devices" are audio input devices that have been identified by the first model 118 as not required for active signal capture during a given time interval or recording session. Non-engaged audio input devices may remain in an inactive, muted, or low-power state and do not contribute to the electronic signal 110 processing pipeline unless or until reclassified as engaged based on updated sensor data 122. The designation of a device as non-engaged may be based on factors such as absence of voice activity, distance from a subject, environmental noise levels, or contextual inferences from other sensor inputs. In a non-limiting example, a table microphone that is not detecting any meaningful audio input may be designated as a non-engaged audio input device and deactivated. In a non-limiting example, a ceiling-mounted microphone located far from an active speaker may be classified as non-engaged due to low signal quality or acoustic interference. In a non-limiting example, a mobile device's built-in microphone may remain in a non-engaged state while a higher-quality external microphone is active. In a non-limiting example, a backup microphone may be classified as non-engaged until signal degradation or dropout is detected in the currently engaged device 120. In a non-limiting example, multiple microphones in a multi-speaker environment may be marked as non-engaged by default and only activated selectively based on real-time engagement assessment by the first model 118.

Still referring to FIG. 1, processor 102 is configured to receive input data 124, wherein the input data 124 comprises the at least an electronic signal 110 from the one or more engaged devices 120. As used in this disclosure, "input data" is information received by a system from one or more sources. In an embodiment, the one or more sources may include sensors, user interfaces, external systems, storage media, and the like. In an embodiment, the input data 124 may be used to perform one or more operations or generate one or more outputs. The input data 124 may include, for example, electronic signals 110, sensor data 122, user commands, digital files, media content, metadata, network transmissions, or combinations thereof. In a non-limiting example, the input data 124 received by processor 102 may include an electronic signal 110 generated by an engaged audio input device, such as a microphone capturing a speaker's voice, along with a corresponding digital representation 116 of that signal, such as a waveform or encoded audio file. In another example, the input data 124 may comprise visual signals from a camera device, where the electronic signal 110 includes raw pixel data and the corresponding digital representation 116 includes a compressed image or video stream. In another non-limiting example, the input data 124 may include motion-related signals from a sensor-equipped device, such as a gyroscope or accelerometer, where the electronic signal 110 captures variations in movement, and the digital representation 116 may take the form of structured sensor data 122 logs or time-series datasets.

With continued reference to FIG. 1, the input data 124 further may include a digital document 126. As used in this disclosure, a "digital document" is information formatted in an electronic file structure that can be stored, transmitted, displayed, or processed by a computing device. In a non-limiting example, the digital document 126 may include a text-based file such as a PDF, DOCX, or TXT containing written content, annotations, or metadata. In another example, the digital document 126 may comprise multimedia elements such as embedded images, video clips, hyperlinks, or audio annotations. In another non-limiting example, the digital document 126 may take the form of a structured file such as a spreadsheet, form, or template configured for automated data extraction, classification, or processing. The digital document 126 may originate from a local file system, be transmitted using a networked application, or be dynamically generated by an external system.

Still referring to FIG. 1, processor 102 is configured to filter, using the at least a processor 102, the input data 124 based on a signal level 128 and a context datum 130 of the at least an electronic signal 110. As used in this disclosure, "signal level" is information representing a quantitative measure of the strength of an audio signal 108. In an embodiment, the signal level 128 may be expressed in units such as decibels and may reflect properties such as amplitude, volume, or signal-to-noise ratio. In an embodiment, the signal level 128 may be used to determine the prominence or clarity of an audio input, such as distinguishing between a foreground speaker and background noise in a multi-speaker environment. As used in this disclosure, "context datum" is information derived from one or more characteristics of an electronic signal 110. In an embodiment, the context datum 130 may provide semantic, environmental, and/or situational cues to inform downstream processing. In an embodiment, the context datum 130 may be generated using natural language processing, acoustic analysis, or machine learning techniques to identify attributes such as speaker intent, conversational topic, emotional tone, or role-based relevance. For example, using natural language processing, the system may transcribe the audio signal 108 into text and analyze it to detect the conversational topic, such as identifying a shift to financial matters when a speaker says, "Let's move on to the budget." The system may also identify speaker intent, such as distinguishing between a question and a command, or determine role-based relevance by recognizing when someone is issuing instructions and inferring that person is likely in a leadership role. Using acoustic analysis, the system may examine tone, pitch, pace, and pauses in speech to infer emotional tone, such as detecting excitement, urgency, or frustration. It may also segment the audio into distinct conversational turns. For example, a raised voice delivered at a rapid pace may indicate an important announcement, while prolonged silence may signal a natural pause or the end of a topic. Machine learning techniques may combine multiple modalities such as audio and video signals to classify content segments 160. A trained model may identify when a speaker is responding to a question as opposed to introducing a new topic. It may also determine whether a segment of speech reflects a personal anecdote or a summary of key information, and tag those segments 160 to support downstream operations such as audio prioritization or automated video editing. In an embodiment, the context datum 130 may support functions such as selecting a key audio source 134, determining camera angle 164, or segmenting content within an output media file 150 as discussed in further detail herein.

Still referring to FIG. 1, processor 102 is configured to determine, using a second model 132, a key audio source 134 as a function of the one or more engaged devices 120 and the filtered input data 124. As used in this disclosure, a "second model" a computational model configured to determine a key audio source 134 from among a plurality of engaged devices 120. In an embodiment, the second model 132 may be a machine learning model trained using multi-modal datasets containing labeled instances of audio streams and corresponding speaker identifications. In an embodiment, the second model 132 may analyze features such as frequency, speaker patterns, or contextual relationships between signals to identify the most relevant or primary audio stream for encoding. For example, the second model 132 may evaluate frequency characteristics to distinguish between human speech and background noise, filtering out sounds such as air conditioning or typing and prioritizing signals within the vocal frequency range. The second model 132 may also learn speaker-specific patterns, such as voice timbre, cadence, or speech intervals, to recognize which individual is consistently contributing meaningful content over time. This may allow the second model 132 to prioritize an audio stream from a recurring speaker even when multiple signals are detected simultaneously. In addition, the second model 132 may assess contextual relationships between signals by correlating audio streams with visual data 114, such as determining whether a speaker is making eye contact with a camera, gesturing, or receiving responses from other participants. If a particular speaker is initiating topics, asking questions, or responding to others frequently, the second model 132 may infer that the individual plays a central role in the dialogue. This information may be used to dynamically rank and select that person's audio stream as the key source for encoding within the media file. As used in this disclosure, "key audio source" is information representing a target audio input among a plurality of received audio signals 108. Without limitation, the key audio source 134 may be selected for inclusion in an output media file 150. In an embodiment, the key audio source 134 may be determined based on a combination of factors including user engagement, speech clarity, semantic content, spatial positioning, contextual importance, and the like. For example, without limitation, the key audio source 134 may be a primary speaker in a group conversation or a voice command directed to a system interface. In an embodiment, user engagement may be assessed using visual input from one or more image capturing device 112 to determine which individual is actively speaking, gesturing, or making eye contact with others or the camera. The apparatus 100 may correlate facial orientation, lip movement, or hand gestures with audio input to identify the speaker that is most engaged with the current context. In a non-limiting example, the apparatus 100 may receive simultaneous audio signals 108 from multiple microphones positioned around a conference table, while a connected image capturing device 112 records visual data 114 of the participants. One participant may be facing the camera directly, speaking clearly, and using expressive hand gestures while explaining a key point. The apparatus 100 may detect their lip movement synchronizing with the captured audio waveform, their facial orientation directed toward the camera, and their active hand gestures. In contrast, another participant may be turned away, with their lips not moving and their hands resting on the table. Based on this visual-to-audio correlation, the apparatus 100 may determine that the first participant is the speaker most actively engaged with the current context and select their audio input as the key audio source 134 for the output media file 150. Without limitation, speech clarity may be determined by analyzing the quality and intelligibility of the audio signal 108. For example, audio sources with high signal-to-noise ratios, low distortion, and clear articulation may be favored over muffled or distant signals. Machine learning models or digital signal processing techniques of the second model 132 may be used to score and rank clarity in real-time. For example, digital signal processing techniques may include noise reduction algorithms that isolate speech frequencies and suppress background interference, as well as spectral analysis methods that assess signal sharpness, harmonic content, and intelligibility. As used in this disclosure, "noise reduction algorithms" are computational techniques used to suppress unwanted background sounds and enhance speech-relevant frequency components in an audio signal 108. In an embodiment, noise reduction algorithms may isolate frequency bands while attenuating signal components outside this range or exhibiting erratic, non-speech-like behavior. The isolated frequency bands associated with human speech may range from 300 Hz to 3400 Hz. As used in this disclosure, "spectral analysis methods" are techniques that analyze an audio signal 108 in the frequency domain to extract meaningful features. The meaningful features may include dominant frequencies, energy distribution, and harmonic structure. In an embodiment, spectral analysis may be used to compute a Short-Time Fourier Transform (STFT) to examine how frequency content evolves over time.

Without limitation, machine learning models may be trained on large datasets of labeled audio samples to classify audio clarity based on features such as waveform smoothness, energy distribution, articulation rate, or presence of reverberation. These models may generate a real-time clarity score for each signal, ranking the streams from most to least intelligible. For instance, a clear voice with minimal background noise and consistent articulation may receive a high score, whereas a muffled or distant voice with echo or cross-talk may be assigned a lower score. These ranked clarity scores may then be used by the system to determine which signal to prioritize as the key audio source 134. Continuing, semantic content may be evaluated using a natural language processing (NLP) model of the second model 132 to extract meaningful topics, phrases, or keywords from each audio stream. In an embodiment, the system may prioritize audio sources associated with certain topic keywords such as, names, questions, transitions, commands, or classify portions of speech as carrying higher informational weight. Spatial positioning may be inferred using stereo microphone arrays, visual depth cues, or known layout configurations of the environment. The apparatus 100 may prioritize audio sources closer to the focal point of a camera or a central position in the room. Contextual importance may be determined by analyzing the overall interaction history, agenda, or roles of participants. For example, if a speaker has previously been identified as a host, moderator, or lead presenter, their audio may be weighted more heavily when selecting the key audio source 134. Additionally and/or alternatively, real-time cues, such as audience responses, changes in speaking pace, or turn-taking behavior, may be used to infer moment-to-moment relevance. In some embodiments, these factors may be combined using a weighted scoring system or input into a trained classification model to generate a ranked list of candidate audio sources. The highest-ranked audio stream may be designated as the key audio source 134, and the associated video may be framed accordingly in the output media file 150. For instance, if a participant has been labeled as the moderator at the start of a session, such as by joining first, initiating the meeting, or being listed as the host in the calendar invite, their audio stream may be assigned a baseline contextual weight of 0.9 on a normalized scale from 0 to 1. Other participants who are less central to the agenda, such as observers or note-takers, may receive lower baseline weights, for example 0.4 or 0.5. In real time, additional dynamic cues may adjust these weights. For example, without limitation, if a participant increases their speaking pace by more than 30% compared to their baseline, or uses imperative language like "let's move on" or "please take note," the system may increase their contextual score by +0.1 to +0.2, reflecting higher real-time engagement or leadership behavior. Similarly, if a speaker receives a high number of verbal or visual responses from others, such as being directly addressed by name three or more times in under a minute, their score may be incrementally boosted. These contextual weights may be combined with signal-level clarity and other input factors in a weighted scoring algorithm.

With continued reference to FIG. 1, the signal level 128 may be expressed in decibels and used to assess whether a particular audio source is sufficiently prominent for consideration in media processing. For example, a high signal level 128 may indicate a close-range speaker or dominant sound, while a low signal level 128 may indicate background noise or distant conversation. For example, a close-range speaker speaking at a normal volume may generate a signal level 128 of approximately –30 dBFS (decibels relative to full scale), which is typically considered strong and clear in digital audio capture. In contrast, background noise such as air conditioning or distant chatter may register between –60 dBFS and –80 dBFS, indicating a much lower signal level 128 that may be filtered or deprioritized. In another example, the apparatus 100 may define a threshold of –45 dBFS for candidate audio sources. Any audio input exceeding this threshold may be considered sufficiently prominent for further evaluation, while signals falling below it may be automatically discarded or weighted lower in key audio source 134 selection. Additionally and/or alternatively, the apparatus 100 may apply normalization or gain adjustments to equalize sources falling within a midrange signal level 128 band, such as between –40 dBFS and –50 dBFS, to maintain consistent playback quality. In certain embodiments, signal level 128 may also be evaluated over time. For example, a sustained average above –35 dBFS for more than 3 seconds may be treated as an active speaker event and flagged for consideration in the final media encoding process. In an embodiment the context datum 130 may support decision-making processes in media encoding. In an embodiment, the context datum 130 may include parsed language constructs, topic identifiers, speaker roles, emotional tone, or associated metadata extracted using natural language processing and computer vision techniques. For example, without limitation, the context datum 130 may identify a question being asked, a command issued, or a topic change during a meeting. For example, without limitation, the context datum 130 may identify a question being asked when the system detects rising intonation, a sentence ending with a question mark in the transcript, and interrogative keywords such as "who," "what," or "how." For instance, the phrase "What's the timeline for launch?" may be tagged as a question event and assigned a context label such as type: inquiry. In another non-limiting example, a command may be identified when the transcript includes imperative verbs at the beginning of a sentence, such as "Send over the revised slides today" or "Let's move on to the next item." The system may classify such speech as a directive, assigning a context label such as type: command. For a topic change, the context datum 130 may detect transitional phrases like "Switching gears," "Let's now talk about," or "The next thing I want to cover . . . " along with a semantic shift in the language model's topic embedding. For instance, without limitation, if a speaker transitions from discussing budgets to discussing team structure, the system may label that segment with type: topic_shift, enabling the apparatus 100 to segment or reframe the visual presentation accordingly. In an embodiment, the second model 132 may receive audio streams originating from engaged devices 120, such as actively selected microphones identified by the first model 118, and evaluate those streams after they have been filtered to remove background noise or irrelevant signal components. The filtered input data 124 may include only those segments 160 that exceed a signal level 128 threshold or exhibit contextual relevance based on semantic or acoustic analysis. The second model 132 may then apply one or more classification or scoring algorithms to assess the relative clarity, prominence, and contextual importance of each candidate audio stream. Based on this evaluation, the second model 132 may identify a single audio stream as the key audio source 134, which may represent the most relevant or dominant speaker for inclusion in an output media file 150. This selection may be dynamic and updated over time based on changing input conditions. In a non-limiting example, the system may receive audio input from three engaged microphones placed around a conference table. The first microphone detects a speaker who is sitting close and speaking clearly; the second captures a participant who is further away and speaking softly; the third picks up ambient typing sounds and faint voices. After applying signal-level filtering, only the first two audio streams remain, as their average amplitudes exceed a predefined threshold of −45 dBFS. The second model 132 may then analyze the filtered streams using a contextual scoring system. The first speaker's audio includes the phrase, "Let's move forward with the budget review," which the system identifies as a command with high contextual importance. The second speaker is making a casual comment unrelated to the meeting topic. The second model 132 assigns a contextual weight of 0.9 to the first speaker's stream and 0.4 to the second. Combining this with a clarity score of 0.88 for the first speaker and 0.65 for the second, the model computes a total score for each input and selects the first speaker's stream as the key audio source 134. The apparatus 100 may then links this selection to a camera angle 164 showing the engaged speaker and includes their voice as the primary audio in the output media file 150.

With continued reference to FIG. 1, the at least a processor 102 may be further configured to train the second model 132 using training dataset 136, wherein the training dataset 136 comprises a plurality of multimodal data 138 corresponding to a plurality of identified key audio sources 140. As used in this disclosure, "training dataset" is information comprising a collection of labeled or structured data samples used to train one or more machine learning models. In an embodiment, the training dataset 136 may include annotated examples of audio and visual content, where each sample is associated with one or more correct outputs or classifications. In an embodiment, the training dataset 136 may be used to adjust the internal parameters of the second model 132 to improve accuracy in identifying key audio sources 134 under varying acoustic and contextual conditions. As used in this disclosure, "multimodal data" is information that includes at least two distinct types of media inputs. In an embodiment, the multimodal data 138 may be associated with the same event, scene, or data instance. Without limitation, the media inputs may include audio, video, images, and the like. In an embodiment, the audio component may include raw or filtered speech signals, while the video component may include corresponding frames, facial expressions, gestures, or speaker positioning. In an embodiment, multimodal data 138 may enable the system to learn relationships between visual cues and spoken content, enhancing the ability of the second model 132 to determine speaker engagement or contextual relevance. As used in this disclosure, "identified key audio sources" is information representing audio inputs that have been labeled as the primary source in a given multimodal data 138 instance. In an embodiment, the identified key audio sources 140 may be determined manually by a human reviewer, or automatically by a reference system, and may include metadata such as timestamps, speaker identity, and justification for relevance. These labels may be used as ground truth in the training dataset 136 to guide the second model 132 in learning to distinguish between primary and secondary audio signals 108. In an embodiment, the training dataset 136 may include video and audio recordings of real or simulated group interactions, such as meetings, interviews, or collaborative sessions. Each training instance may contain synchronized video frames and audio streams, along with ground truth labels identifying which audio stream constitutes the key audio source 134 for that segment. For example, without limitation, the training dataset 136 may include a five-minute video clip of a roundtable discussion, with the corresponding audio signal 108 from each participant, and a label indicating that Speaker A was the primary contributor during the first two minutes, followed by Speaker B for the remainder. The processor 102 may analyze the audio features, visual cues, and labeled outcomes to update the internal parameters of the second model 132. Over time, the second model 132 may learn to associate specific signal patterns, such as speaker clarity, engagement gestures, or contextual importance, with the likelihood that a given audio source should be selected as the key source in future, unlabeled scenarios.

With continued reference to FIG. 1, the at least a processor 102 may be further configured to retrain the second model 132 using user feedback 142, wherein the user feedback 142 comprises at least an identification 144 of a confirmed key audio source 146. As used in this disclosure, "user feedback" is information provided by one or more users to evaluate, confirm, or refine the performance of a model. In an embodiment, the user feedback 142 may include selections, annotations, corrections, or approvals that reflect the user's judgment regarding the accuracy or relevance of the outputs of the second model 132. In an embodiment, the user feedback 142 may be used to retrain or fine-tune a machine learning model to improve future predictions, such as identifying the correct key audio source 134 in recorded media. As used in this disclosure, "identification" is information representing the act or result of specifying an element within a system output. In an embodiment, the identification 144 may include a user's selection of an audio stream, designation of a speaker, or validation of a predicted output. The identification 144 may be expressed as a timestamped reference, label, or indexed selection used to guide training or system refinement. As used in this disclosure, "confirmed key audio source" is information indicating a user-validated or otherwise verified audio input that has been determined to be the primary signal. In an embodiment, the confirmed key audio source 146 may be identified through user interaction with a media playback interface, a post-session review process, or an annotation tool, and may serve as ground truth for retraining the second model 132. The confirmed key audio source 146 may include metadata such as the selected speaker, associated time range, and contextual reasoning provided by the user. In an embodiment, the confirmed key audio source 146 may be identified through user interaction with a media playback interface, a post-session review process, or an annotation tool, and may serve as ground truth for retraining the second model 132. For example, without limitation, a media playback interface may display a segmented timeline of a recorded meeting, with the predicted key audio source 134 highlighted for each segment. Continuing, a user reviewing the session may click on a specific time interval, listen to the audio, and manually select a different speaker from a dropdown menu or waveform overlay if the prediction of the apparatus 100 was incorrect. This user correction may then be stored along with a timestamp, speaker ID, and confirmation flag, designating it as a confirmed key audio source 146. In a post-session review process, users may receive an automated summary of predicted speaker segments 160 and be asked to approve or revise them. For instance, without limitation, if the second model 132 assigns Speaker C as the key audio source 134 from 10:00 to 12:00, the user may review that segment and submit a correction stating that Speaker A should have been the focus, optionally including reasoning such as "Speaker A introduced the main topic." This input may be recorded in a structured feedback format and stored for future training cycles. Additionally and/or alternatively, an annotation tool may present synchronized audio and video streams along with engagement metrics and contextual cues 154, allowing users, such as editors or reviewers, to tag which speaker was most relevant in each scene. These tags may be exported as labeled training data, which the processor 102 uses to retrain the second model 132 to improve future predictions based on real-world usage. In a non-limiting example, a user may review a recorded media file in which the system has automatically selected a key audio source 134 for each segment. During playback, the user notices that in the first two minutes of the recording, the apparatus 100 may incorrectly select Speaker B as the key audio source 134, even though Speaker A was leading the discussion. The user may manually select Speaker A's audio stream and tag that segment as the correct, or confirmed, key audio source. Without limitation, this manual correction may be captured as user feedback 142 and stored in the system with metadata including the start and end time, the identity of Speaker A, and a confidence level set by the user such as "high confidence". In another non-limiting example, the user interface may display a timeline of the conversation, and the user may be prompted to confirm or adjust the system's predicted key audio source 134 at various intervals. For a five-minute clip, the user may accept the choice of the apparatus 100 in three segments 160 but override it in two, selecting alternative speakers. Each of these interactions may create labeled examples that the processor 102 uses to retrain the second model 132. Over time, this feedback loop may enable the apparatus 100 to improve accuracy in real-world conditions by learning from human corrections and preferences.

Still referring to FIG. 1, processor 102 is configured to generate, using a virtual director 148, an output media file 150 as a function of the key audio source 134. As used in this disclosure, "virtual director" is a software-based decision-making component configured to automate media production tasks by selecting, sequencing, or modifying media content. The virtual director 148 may modify the media content based on contextual, semantic, or engagement-related inputs. In an embodiment, the virtual director 148 may receive data such as key audio sources 134, camera angles, visual focus indicators, and contextual cues 154, and use this information to generate an edited media output. The virtual director 148 may perform operations such as selecting a camera angle 164 based on speaker location, transitioning between shots in response to dialogue shifts, or adjusting timing and sequencing to optimize viewer comprehension or storytelling flow. In an embodiment, the virtual director 148 may receive the filtered signal from one or more engaged devices 120 and apply additional rule-based filtering to determine when to switch between microphones or camera views. The virtual director 148 may operate across multiple input sources, such as four microphones and three cameras, each associated with a set of up to 25 predefined camera positions or presets. These camera presets may be mapped to participant locations, which may be identified using audio localization, QR code scanning during setup, or real-time spatial tracking. In an embodiment, the second model 132 may be configured to identify the key audio source 134 by analyzing input from multiple microphones using signal level 128, contextual cues 154, and semantic content. The second model 132 may consider factors such as speaker clarity, conversational role, and proximity to determine the active speaker from among multiple engaged devices 120. For example, without limitation, four microphones may be distributed across a meeting space, and the second model 132 may analyze the audio signals 108 in real time to determine which participant is currently leading the conversation. That identification 144 of the key audio source 134 may then provide to the virtual director 148. In an embodiment, the second model 132 may generate a structured output indicating the identified key audio source, which may include metadata such as the selected audio stream's device ID, speaker identity, timestamp, signal strength, and contextual relevance score. This structured output may be encapsulated in a data object or real-time message and provided to the virtual director 148 through an inter-process communication (IPC) channel, application programming interface (API), or shared memory space. The virtual director 148 may poll or subscribe to this stream of key audio source 134 updates and use the metadata to determine which camera preset to activate, when to apply a visual transition, and how to sequence content within the output media file 150. In some embodiments, the communication may be event-driven, where each update from the second model 132 triggers a production decision by the virtual director 148 in near real-time. This coordination may allow the apparatus 100 to dynamically synchronize audio and video framing decisions based on speaker relevance and contextual dynamics. Continuing, in an embodiment, the virtual director 148 may receive the key audio source 134 from the second model 132 and apply a set of filtering rules and production logic to dynamically generate an output media file 150. The virtual director 148 may use the key audio source 134 to drive camera selection logic, choosing between close-up or wide shots depending on the signal level 128, detected pauses, or body language. For instance, without limitation, the virtual director 148 may automatically switch to a wide-angle shot during a group laugh or use a close-up shot when the identified speaker is issuing a directive. The apparatus 100 may be configured with three cameras and up to 25 preset positions, allowing fine-grained spatial targeting based on the participant's known or estimated location. QR codes may be used during setup for mapping participants to camera presets, and the microphones may provide audio-based spatial localization. Without limitation, the virtual director 148 may also incorporate large language model 152 (LLM) analysis to assess the content of the speech and refine camera transitions or layout composition accordingly. In an embodiment, body language, such as hand gestures or eye direction, may also be factored into shot framing. The apparatus 100 may support telerobotics features for remote camera movement and may include a feedback or coaching interface for presenters. Designed to operate on local hardware, the virtual director 148 may accept diverse input stream types, including live video, presentation slides, screen captures, or static images, and automatically assemble them into a coherent, context-aware output media file 150 based on the active speaker and scene dynamics. As used in this disclosure, "output media file" is information representing a digital file that contains processed media content. The media content may include, without limitation, audio, video, and/or multimedia content that has been formatted using one or more compression or encoding standards for playback, transmission, or storage. In an embodiment, the output media file 150 may comprise synchronized audio and video tracks, metadata, time-stamped speaker labels, transitions, and visual framing derived from system-determined decisions such as key audio source 134 selection. The file may be output in formats such as MP4, MOV, or similar, and may be suitable for viewing through standard media players or embedded streaming platforms.

With continued reference to FIG. 1, generating, using the virtual director 148 the output media file 150 further may include analyzing, using a large language model 152, the at least an electronic signal 110 of the input data 124 to identify one or more contextual cues 154, wherein analyzing the at least an electronic signal 110 comprises parsing the at least an electronic signal 110 to identify semantic meaning 156, detecting linguistic features 158, and classifying segments 160 of the at least an electronic signal 110 to a plurality of categories 162 to generate the context datum 130 for downstream processing, selecting, based on the one or more contextual cues 154, an angle 164 of the at least an image capturing device 112 corresponding to a target view 166, and generating, as a function of a selection, a sequence of visual transitions 168 for the output media file 150. A "large language model," as used herein, is a deep learning data structure that can recognize, summarize, translate, predict and/or generate text and other content based on knowledge gained from massive datasets. Large language models may be trained on large sets of data. Training sets may be drawn from diverse sets of data such as, as non-limiting examples, podcast transcripts, interviews, articles, blog posts, and other forms of unstructured textual or audio-derived data. This may enable the LLM 152 to understand natural conversation flow, detect speaker intent, and support downstream tasks such as automated editing, segment labeling, or searchable transcript generation. In some embodiments, training sets may include a variety of subject matters, such as, nonlimiting examples, podcast transcripts, interview recordings, show notes, speaker biographies, listener reviews, episode descriptions, conversational dialogues, guest introductions, promotional blurbs, and the like. In some embodiments, training sets of an LLM may include information from one or more public or private databases. As a non-limiting example, training sets may include databases associated with an entity. In some embodiments, training sets may include portions of documents associated with the electronic records correlated to examples of outputs. In an embodiment, an LLM 152 may include one or more architectures based on capability requirements of an LLM 152. Exemplary architectures may include, without limitation, GPT (Generative Pretrained Transformer), BERT (Bidirectional Encoder Representations from Transformers), T5 (Text-To-Text Transfer Transformer), and the like. Architecture choice may depend on the capability needed such as generative, contextual, or other specific capabilities.

With continued reference to FIG. 1, in some embodiments, an LLM 152 may be generally trained. As used in this disclosure, a "generally trained" LLM is an LLM 152 that is trained on a general training set comprising a variety of subject matters, data sets, and fields. In some embodiments, an LLM 152 may be initially generally trained. Additionally, or alternatively, an LLM 152 may be specifically trained. As used in this disclosure, a "specifically trained" LLM is an LLM 152 that is trained on a specific training set, wherein the specific training set includes data including specific correlations for the LLM 152 to learn. As a non-limiting example, an LLM 152 may be generally trained on a general training set, then specifically trained on a specific training set. In an embodiment, specific training of an LLM 152 may be performed using a supervised machine learning process. In some embodiments, generally training an LLM 152 may be performed using an unsupervised machine learning process. As a non-limiting example, specific training set may include information from a database. As a non-limiting example, specific training set may include text related to the users such as user specific data for electronic records correlated to examples of outputs. In an embodiment, training one or more machine learning models may include setting the parameters of the one or more models (weights and biases) either randomly or using a pretrained model. Generally training one or more machine learning models on a large corpus of text data can provide a starting point for fine-tuning on a specific task. A model such as an LLM 152 may learn by adjusting its parameters during the training process to minimize a defined loss function, which measures the difference between predicted outputs and ground truth. Once a model has been generally trained, the model may then be specifically trained to fine-tune the pretrained model on task-specific data to adapt it to the target task. Fine-tuning may involve training a model with task-specific training data, adjusting the model's weights to optimize performance for the particular task. In some cases, this may include optimizing the model's performance by fine-tuning hyper-parameters such as learning rate, batch size, and regularization. Hyperparameter tuning may help in achieving the best performance and convergence during training. In an embodiment, fine-tuning a pretrained model such as an LLM 152 may include fine-tuning the pretrained model using Low-Rank Adaptation (LoRA). As used in this disclosure, "Low-Rank Adaptation" is a training technique for large language models that modifies a subset of parameters in the model. Low-Rank Adaptation may be configured to make the training process more computationally efficient by avoiding a need to train an entire model from scratch. In an exemplary embodiment, a subset of parameters that are updated may include parameters that are associated with a specific task or domain.

With continued reference to FIG. 1, in some embodiments an LLM 152 may include and/or be produced using Generative Pretrained Transformer (GPT), GPT-2, GPT-3, GPT-4, and the like. GPT, GPT-2, GPT-3, GPT-3.5, and GPT-4 are products of Open AI Inc., of San Francisco, CA. An LLM 152 may include a text prediction based algorithm configured to receive an article and apply a probability distribution to the words already typed in a sentence to work out the most likely word to come next in augmented articles. For example, if some words that have already been typed are "Nice to meet", then it may be highly likely that the word "you" will come next. An LLM 152 may output such predictions by ranking words by likelihood or a prompt parameter. For the example given above, an LLM 152 may score "you" as the most likely, "your" as the next most likely, "his" or "her" next, and the like. An LLM 152 may include an encoder component and a decoder component.

With continued reference to FIG. 1, an LLM 152 may include a transformer architecture. In some embodiments, encoder component of an LLM 152 may include transformer architecture. A "transformer architecture," for the purposes of this disclosure is a neural network architecture that uses self-attention and positional encoding. Transformer architecture may be designed to process sequential input data 124, such as natural language, with applications towards tasks such as translation and text summarization. Transformer architecture may process the entire input all at once. "Positional encoding," for the purposes of this disclosure, refers to a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

With continued reference to FIG. 1, an LLM 152 and/or transformer architecture may include an attention mechanism. An "attention mechanism," as used herein, is a part of a neural architecture that enables a system to dynamically quantify the relevant features of the input data 124. In the case of natural language processing, input data 124 may be a sequence of textual elements. It may be applied directly to the raw input or to its higher-level representation.

With continued reference to FIG. 1, attention mechanism may represent an improvement over a limitation of an encoder-decoder model. An encoder-decider model encodes an input sequence to one fixed length vector from which the output is decoded at each time step. This issue may be seen as a problem when decoding long sequences because it may make it difficult for the neural network to cope with long sentences, such as those that are longer than the sentences in the training corpus. Applying an attention mechanism, an LLM 152 may predict the next word by searching for a set of positions in a source sentence where the most relevant information is concentrated. An LLM 152 may then predict the next word based on context vectors associated with these source positions and all the previously generated target words, such as textual data of a dictionary correlated to a prompt in a training data set. A "context vector," as used herein, are fixed-length vector representations useful for document retrieval and word sense disambiguation.

With continued reference to FIG. 1, attention mechanism may include, without limitation, generalized attention self-attention, multi-head attention, additive attention, global attention, and the like. In generalized attention, when a sequence of words or an image is fed to an LLM 152, it may verify each element of the input sequence and compare it against the output sequence. Each iteration may involve the mechanism's encoder capturing the input sequence and comparing it with each element of the decoder's sequence. From the comparison scores, the mechanism may then select the words or parts of the image that it needs to pay attention to. In self-attention, an LLM 152 may pick up particular parts at different positions in the input sequence and over time compute an initial composition of the output sequence.

In multi-head attention, an LLM 152 may include a transformer model of an attention mechanism. Attention mechanisms, as described above, may provide context for any position in the input sequence. For example, if the input data 124 is a natural language sentence, the transformer does not have to process one word at a time. In multi-head attention, computations by an LLM 152 may be repeated over several iterations, each computation may form parallel layers known as attention heads. Each separate head may independently pass the input sequence and corresponding output sequence element through a separate head. A final attention score may be produced by combining attention scores at each head so that every nuance of the input sequence is taken into consideration. In additive attention (Bahdanau attention mechanism), an LLM 152 may make use of attention alignment scores based on a number of factors. Alignment scores may be calculated at different points in a neural network, and/or at different stages represented by discrete neural networks. Source or input sequence words are correlated with target or output sequence words but not to an exact degree. This correlation may take into account all hidden states and the final alignment score is the summation of the matrix of alignment scores. In global attention (Luong mechanism), in situations where neural machine translations are required, an LLM 152 may either attend to all source words or predict the target sentence, thereby attending to a smaller subset of words.

With continued reference to FIG. 1, multi-headed attention in encoder may apply a specific attention mechanism called self-attention. Self-attention allows models such as an LLM 152 or components thereof to associate each word in the input, to other words. As a non-limiting example, an LLM 152 may learn to associate the word "you", with "how" and "are". It is also possible that an LLM 152 learns that words structured in this pattern are typically a question and to respond appropriately. In some embodiments, to achieve self-attention, input may be fed into three distinct fully connected neural network layers to create query, key, and value vectors. A query vector may include an entity's learned representation for comparison to determine attention score. A key vector may include an entity's learned representation for determining the entity's relevance and attention weight. A value vector may include data used to generate output representations. Query, key, and value vectors may be fed through a linear layer; then, the query and key vectors may be multiplied using dot product matrix multiplication in order to produce a score matrix. The score matrix may determine the amount of focus for a word should be put on other words (thus, each word may be a score that corresponds to other words in the time-step). The values in score matrix may be scaled down. As a non-limiting example, score matrix may be divided by the square root of the dimension of the query and key vectors. In some embodiments, the softmax of the scaled scores in score matrix may be taken. The output of this softmax function may be called the attention weights. Attention weights may be multiplied by your value vector to obtain an output vector. The output vector may then be fed through a final linear layer.

With continued reference to FIG. 1, in order to use self-attention in a multi-headed attention computation, query, key, and value may be split into N vectors before applying self-attention. Each self-attention process may be called a "head." Each head may produce an output vector and each output vector from each head may be concatenated into a single vector. This single vector may then be fed through the final linear layer discussed above. In theory, each head can learn something different from the input, therefore giving the encoder model more representation power.

With continued reference to FIG. 1, encoder of transformer may include a residual connection. Residual connection may include adding the output from multi-headed attention to the positional input embedding. In some embodiments, the output from residual connection may go through a layer normalization. In some embodiments, the normalized residual output may be projected through a pointwise feed-forward network for further processing. The pointwise feed-forward network may include a couple of linear layers with a ReLU activation in between. The output may then be added to the input of the pointwise feed-forward network and further normalized.

With continued reference to FIG. 1, transformer architecture may include a decoder. Decoder may be a multi-headed attention layer, a pointwise feed-forward layer, one or more residual connections, and layer normalization (particularly after each sub-layer), as discussed in more detail above. In some embodiments, decoder may include two multi-headed attention layers. In some embodiments, decoder may be autoregressive. For the purposes of this disclosure, "autoregressive" means that the decoder takes in a list of previous outputs as inputs along with encoder outputs containing attention information from the input.

With further reference to FIG. 1, in some embodiments, input to decoder may go through an embedding layer and positional encoding layer in order to obtain positional embeddings. Decoder may include a first multi-headed attention layer, wherein the first multi-headed attention layer may receive positional embeddings.

With continued reference to FIG. 1, first multi-headed attention layer may be configured to not condition to future tokens. As a non-limiting example, when computing attention scores on the word "am," decoder should not have access to the word "fine" in "I am fine," because that word is a future word that was generated after. The word "am" should only have access to itself and the words before it. In some embodiments, this may be accomplished by implementing a look-ahead mask. Look ahead mask is a matrix of the same dimensions as the scaled attention score matrix that is filled with "0s" and negative infinities. For example, the top right triangle portion of look-ahead mask may be filled with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when the softmax of this matrix is taken, the negative infinities will be zeroed out; this leaves zero attention scores for "future tokens."

With continued reference to FIG. 1, second multi-headed attention layer may use encoder outputs as queries and keys and the outputs from the first multi-headed attention layer as values. This process matches the encoder's input to the decoder's input, allowing the decoder to decide which encoder input is relevant to put a focus on. The output from second multi-headed attention layer may be fed through a pointwise feedforward layer for further processing.

With continued reference to FIG. 1, the output of the pointwise feedforward layer may be fed through a final linear layer. This final linear layer may act as a classifier. This classifier may be as big as the number of classes that you have. For example, if you have 10,000 classes for 10,000 words, the output of that classifier will be of size 10,000. The output of this classifier may be fed into a softmax layer which may serve to produce probability scores between zero and one. The index may be taken of the highest probability score in order to determine a predicted word.

With continued reference to FIG. 1, decoder may take this output and add it to the decoder inputs. Decoder may continue decoding until a token is predicted. Decoder may stop decoding once it predicts an end token.

With continued reference to FIG. 1, in some embodiment, decoder may be stacked N layers high, with each layer taking in inputs from the encoder and layers before it. Stacking layers may allow an LLM 152 to learn to extract and focus on different combinations of attention from its attention heads.

With continued reference to FIG. 1, an LLM 152 may receive an input. Input may include a string of one or more characters. Inputs may additionally include unstructured data. For example, input may include one or more words, a sentence, a paragraph, a thought, a query, and the like. A "query" for the purposes of the disclosure is a string of characters that poses a question. In some embodiments, input may be received from a user device. User device may be any computing device that is used by a user. As non-limiting examples, user device may include desktops, laptops, smartphones, tablets, and the like. In some embodiments, input may include any set of data associated with a podcast episode, such as raw audio recordings, guest speaker metadata, transcript files, episode titles, segment timestamps, listener engagement metrics, or promotional summaries.

With continued reference to FIG. 1, an LLM 152 may generate at least one annotation as an output. At least one annotation may be any annotation as described herein. In some embodiments, an LLM 152 may include multiple sets of transformer architecture as described above. Output may include a textual output. A "textual output," for the purposes of this disclosure is an output comprising a string of one or more characters. Textual output may include, for example, a plurality of annotations for unstructured data. In some embodiments, textual output may include a phrase or sentence identifying the status of a user query. In some embodiments, textual output may include a sentence or plurality of sentences describing a response to a user query.

With continued reference to FIG. 1, as used in this disclosure, "contextual cues" are information derived from audio or visual data 114 that provide interpretive insight about speaker intent, conversation flow, emotional tone, or engagement level. In an embodiment, contextual cues 154 may include indicators such as changes in volume, pacing, intonation, language structure, gestures, or facial expressions. For example, without limitation, a rising tone combined with the phrase "Can you explain that again?" may indicate a question, while a prolonged pause following a strong statement may signal a topic shift or emphasis. As used in this disclosure, "semantic meaning" is information representing the intended or inferred meaning of spoken content, as determined through natural language understanding. In an embodiment, semantic meaning 156 may be extracted by parsing the transcript of an audio signal 108 to identify key topics, themes, or communicative intent. For example, a speaker saying "Let's move on to the budget" may be semantically classified as initiating a topic transition to financial matters. As used in this disclosure, "linguistic features" are information representing structural and stylistic attributes of speech or text that help characterize communication. In an embodiment, linguistic features 158 may include sentence structure, part of speech tags, word frequency, lexical diversity, filler words, or specific discourse markers such as "um," "however," or "so." These features may help distinguish between casual dialogue, formal statements, rhetorical questions, and other types of speech segments 160. As used in this disclosure, "category" is information representing a classification label assigned to a segment of an audio signal 108. The category 162 may be assigned based on its linguistic or semantic properties. In an embodiment, categories may include, without limitation, question, command, topic change, anecdote, clarification, transition, closing remark, and the like. These classifications may be used to guide downstream media processing decisions such as audio prioritization, camera framing, or editing logic. As used in this disclosure, "angle" is information representing the directional positioning of an image capturing device 112 relative to a subject or scene. In an embodiment, the angle 164 may correspond to a specific physical orientation or preset camera configuration, such as front-facing, profile, wide shot, over-the-shoulder, or audience view. As used in this disclosure, "target view" is information representing an intended visual composition associated with a particular subject, speaker, or event. In an embodiment, the target view 166 may be determined based on the identified key audio source and contextual cues 154, and may correspond to a specific angle 164, zoom level, or framing layout that aligns with the current focus of the conversation. As used in this disclosure, "sequence of visual transitions" is information representing an ordered set of visual changes in the output media file 150. In an embodiment, the visual changes may include, without limitation, switching between camera angles, frames, or scenes in an output media file 150. In an embodiment, the sequence of visual transitions 168 may include cuts, fades, zooms, pans, or other effects used to smoothly shift viewer attention between speakers or topics, and may be generated dynamically based on the evolving structure of the input data 124.

With continued reference to FIG. 1. in a non-limiting example, the large language model 152 may parse the transcript of a podcast recording to identify semantic meaning 156, such as detecting that a speaker has transitioned from small talk to a discussion about mental health policy, which signals a shift in the thematic content of the conversation. The LLM 152 may further detect linguistic features 158 such as a rising intonation and the use of interrogative words (e.g., "how," "why," or "can you") to identify a segment as a question. In another segment, repeated use of directive language such as "let's move on" or "please explain that" may be classified as a command. These segments 160 may be classified into categories such as "introduction," "main discussion," "audience Q&A," or "closing remarks." Using these contextual cues 154, the virtual director 148 may then select an appropriate angle 164 of the image capturing device 112 that corresponds to a target view 166. For example, if the context datum 130 indicates a question being asked by a remote guest, the system may activate a close-up shot of that speaker. If a host is introducing a guest or providing commentary, the system may switch to a wide-angle view to show both participants. Based on these selections, the virtual director 148 may generate a sequence of visual transitions 168 such as a smooth crossfade from the guest to the host, followed by a cut to a side-angle shot during a moment of shared laughter. These transitions may be compiled into the output media file 150, allowing for a polished and context-aware visual experience that aligns with the structure and flow of the spoken content.

With continued reference to FIG. 1, the at least a processor 102 may be further configured to train the virtual director

148 using director training data 170, wherein the director training data 170 comprises historical multimedia files associated with historical output media files 174. As used in this disclosure, "director training data" is information used to train the virtual director 148. In an embodiment, the director training data 170 may include structured or unstructured media content and associated annotations or production decisions that inform automated audiovisual editing behavior. In an embodiment, the director training data 170 may include pairs of input recordings and corresponding editorial outputs, allowing the virtual director 148 to learn patterns in framing, transitions, speaker focus, and timing. The director training data 170 may be used to improve the system's ability to simulate human-like direction in dynamically generated media files. As used in this disclosure, "historical multimedia files" are information comprising previously recorded and stored media content. The media content may include at least audio and video components. In an embodiment, historical multimedia files may include raw video footage, multi-angle camera feeds, audio tracks from multiple microphones, and auxiliary metadata such as timestamps, speaker IDs, or session notes. Without limitation, the historical multimedia files may represent the unprocessed or pre-edited inputs originally captured during prior sessions, interviews, or recordings. As used in this disclosure, "historical output media files" are information comprising previously generated output files that were created from historical multimedia files through prior processing, editing, or encoding steps. In an embodiment, historical output media files 174 may reflect the finalized audiovisual presentation produced from a past event or session, incorporating decisions such as selected audio streams, chosen camera angles, transition effects, and scene timing. The historical output media files 174 may serve as examples of desired editing outcomes and be used as reference targets during training of the virtual director 148. In an embodiment, the director training data 170 may include previously recorded audiovisual content, such as podcast sessions, interviews, or panel discussions, along with their corresponding edited outputs. The historical multimedia files may contain raw, unedited recordings from multiple microphones and camera angles, while the historical output media files 174 may reflect the final versions of those sessions, incorporating curated camera transitions, speaker framing, and audio selections. The processor 102 may be configured to analyze patterns across these data pairs to learn how framing decisions were made in response to conversational flow, speaker changes, or topic shifts. Without limitation, by comparing raw inputs to their edited counterparts, the virtual director 148 may learn to predict and replicate similar production choices in future sessions. This approach may allow the system to gradually improve its automated editing capabilities, enabling the generation of polished, context-aware media files that reflect prior stylistic or editorial preferences. Additionally and/or alternatively, the processor 102 may use user feedback 142 to iteratively refine and retrain the virtual director 148. For example, without limitation, if a user overrides an automatically selected shot or audio source and confirms an alternative configuration, that correction may be stored and later incorporated as a labeled training instance. Over time, this combination of historical examples and real-time user feedback 142 may enable the virtual director 148 to adapt its behavior to better match content style preferences, conversational dynamics, and editorial goals.

With continued reference to FIG. 1, the virtual director 148 may be further configured to analyze the director training data 170, wherein the director training data 170 comprises synchronized historical multimedia files 172, wherein analyzing the director training data 170 comprises identifying patterns associated with non-verbal contextual events, determine, using one or more rule-based logic operations 176, whether the key audio source 134 corresponds to a secondary event 178, and select, based on the one or more rule-based logic operations 176, an alternate camera angle 180 when the secondary event 178 satisfies a predefined switching condition 182. As used in this disclosure, "synchronized historical multimedia files" are information comprising previously recorded audio and video content that have been aligned to reflect accurate timing relationships between multiple input streams. In an embodiment, the synchronized historical multimedia files 172 may include multi-camera video recordings and corresponding multi-microphone audio tracks captured during a podcast, interview, or live session. The synchronized historical multimedia files 172 may be based on timestamps, waveform alignment, or metadata, allowing the virtual director 148 to analyze how audiovisual elements were coordinated in the final production. As used in this disclosure, "non-verbal contextual events" are information representing significant behavioral or environmental signals captured in media that do not involve spoken language. In an embodiment, non-verbal contextual events may include actions such as laughing, clapping, gesturing, nodding, or shifting posture. Without limitation, non-verbal contextual events may be visually or acoustically detected and used to infer engagement, emphasis, audience reaction, or transitions in tone or pacing. As used in this disclosure, "rule-based logic operation" is information representing a decision-making process that applies predefined logical conditions or heuristics to input data 124 to produce a structured output. In an embodiment, a rule-based logic operation may involve conditional statements such as "if a speaker pauses for more than two seconds and another participant begins to gesture, switch camera," or "if laughter is detected and no speech is present, change to a wide shot." These rules may be encoded as Boolean expressions, flowcharts, or declarative policies executed by the virtual director 148.

With continued reference to FIG. 1, as used in this disclosure, "secondary event" is information representing an occurrence in the media timeline that is contextually relevant but not part of the primary audio content. In an embodiment, a secondary event 178 may include a listener reacting with laughter, an off-camera participant making a visible gesture, or a background participant preparing to speak. In an embodiment, the secondary event 178 may be used to enrich visual storytelling or anticipate upcoming dialogue shifts.

As used in this disclosure, "alternate camera angle" is information representing a camera view that differs from the current or default angle. In an embodiment, the alternate camera angle 180 may be chosen to emphasize a different subject, viewpoint, or visual composition. In an embodiment, an alternate camera angle 180 may include switching from a close-up of the speaker to a wide shot of the group, a reaction shot of another participant, or a side-angle view that captures both verbal and non-verbal interactions. As used in this disclosure, "predefined switching condition" is information representing a specific rule or threshold that, when met, triggers a change in camera angle 164, audio focus, or other audiovisual output. In an embodiment, a predefined switching condition 182 may include criteria such as a sustained silence exceeding 1.5 seconds, detection of laughter without overlapping speech, or a visible gesture from a non-speaking participant. When the virtual director 148 detects that such a condition has been satisfied, it may initiate a transition to an alternate camera angle 180 to maintain visual engagement or narrative clarity. In an embodiment, these synchronized historical multimedia files 172 may include time-aligned audio and video content captured from past podcast episodes or interview sessions, where multiple camera angles and microphone inputs were recorded and later edited into finalized media files. The virtual director 148 may analyze this training data to identify patterns associated with non-verbal contextual events, such as a speaker laughing, a guest nodding in agreement, or an audience reacting silently to a moment of emphasis. In an embodiment, the virtual director 148 may be configured to determine, using one or more rule-based logic operations 176, whether the current key audio source 134 corresponds to a secondary event 178 rather than a primary speech-driven interaction. For instance, without limitation, if the key audio source 134 is a short utterance during group laughter or a low-volume comment during a reaction shot, the apparatus 100 may classify that interaction as secondary. The rule-based logic operations 176 may include conditional rules such as "if speaker pauses longer than 1.5 seconds and laughter is detected, treat as secondary event." If such a secondary event 178 satisfies a predefined switching condition 182, such as a long pause, audible laughter without overlapping speech, or the presence of visible gestures from a non-speaking participant, the virtual director 148 may be configured to select an alternate camera angle 180. For example, without limitation, the virtual director 148 may switch from a close-up of the key speaker to a wide-angle shot capturing group reaction, or shift to a profile view that includes the gesturing participant. This allows the virtual director 148 to respond to subtle, non-verbal cues and improve viewer engagement by mimicking human-like editing patterns observed in prior high-quality productions.

With continued reference to FIG. 1, the at least a processor 102 may be further configured to personalize the output media file 150 based on user profile data 184, wherein personalizing the output media file 150 comprises modifying the one or more visual transitions based on a viewing preference 186 within the user profile data 184. As used in this disclosure, "user profile data" is information associated with an individual user. In an embodiment, the user profile data 184 may reflect personal characteristics, behavioral patterns, preferences, interaction history, and the like. In an embodiment, user profile data 184 may include, without limitation, demographic information, device type, playback history, engagement metrics such as rewind or skip behavior, audio or video quality settings, and content formatting preferences. The user profile data 184 may be stored locally or remotely and used to dynamically tailor the presentation of the output media file 150 to suit an individual's viewing habits or expectations. As used in this disclosure, "viewing preference" is information within the user profile data 184 that represents one or more favored visual presentation styles, sequencing patterns, or display behaviors. In an embodiment, the viewing preference 186 may be selected by the user or inferred by the apparatus 100. In an embodiment, the viewing preference 186 may include, without limitation, preferences for fast-paced visual transitions, minimal camera switching, wide versus close-up shots, inclusion or exclusion of reaction shots, or thematic overlays. For example, without limitation, a user who frequently skips segments 160 with multiple camera cuts may be inferred to prefer longer, uninterrupted single-angle views, and the output media file 150 may be adjusted accordingly to enhance that user's experience. In an embodiment, the apparatus 100 may retrieve or access user profile data 184 associated with an individual user, which may include preferences related to pacing, shot composition, or overall editing style. For example, if the user's profile indicates a preference for minimal visual disruption, the processor 102 may reduce the frequency of camera cuts and favor longer continuous shots or smoother transitions such as crossfades rather than sharp cuts. In another non-limiting example, a user who frequently watches content on a mobile device may have a viewing preference 186 for close-up shots and reduced wide-angle framing, prompting the system to adapt the output media file 150 to show speaker facial expressions more prominently. Without limitation, the personalization process may allow the virtual director 148 to adapt the final output of the output media file 150 to match the user's expectations and patterns, resulting in a more tailored and engaging viewing experience.

Still referring to FIG. 1, processor 102 is configured to present, using a downstream device 188, the output media file 150. As used in this disclosure, "downstream device" is a device that accesses and interacts with apparatus 100. For instance, and without limitation, downstream device 188 may include a remote device and/or apparatus 100. In a non-limiting embodiment, downstream device 188 may be consistent with a computing device as described in the entirety of this disclosure. Without limitation, the downstream device 188 may include a display device. As used in this disclosure, a "display device" refers to an electronic device that visually presents information to the entity. In some cases, display device may be configured to project or show visual content generated by computers, video devices, or other electronic mechanisms. In some cases, display device may include a liquid crystal display (LCD), a cathode ray tube (CRT), a plasma display, a light emitting diode (LED) display, and any combinations thereof. In a non-limiting example, one or more display devices may vary in size, resolution, technology, and functionality. Display device may be able to show any data elements and/or visual elements as listed above in various formats such as, textural, graphical, video among others, in either monochrome or color. Display device may include, but is not limited to, a smartphone, tablet, laptop, monitor, tablet, and the like. Display device may include a separate device that includes a transparent screen configured to display computer generated images and/or information. In some cases, display device may be configured to present a graphical user interface 190 (GUI) to a user, wherein a user may interact with a GUI 190. In some cases, a user may view a GUI 190 through display. Additionally, or alternatively, processor 102 be connected to display device. In one or more embodiments, transmitting the output media file 150 may include displaying the output media file 150 at display device using a visual interface. In an embodiment, the presentation may include a visual presentation, such as displaying synchronized video content with selected camera angles, visual transitions, and on-screen graphics on a monitor, smartphone, or streaming platform. Alternatively and/or additionally, the presentation may include an audio presentation, such as playing back the selected key audio source 134 through a speaker system, headphones, or smart assistant interface. The downstream device 188 may include any output hardware capable of rendering audiovisual content, and the output media file 150 may be formatted for optimized playback based on the device type, resolution, and user-specific settings. In some embodiments, the presentation may support live or asynchronous delivery and may dynamically adjust based on real-time playback controls or accessibility features.

With continued reference to FIG. 1, the at least a processor 102 may be further configured to display, using a graphical user interface 190 of the downstream device 188, the output media file 150, wherein displaying the output media file 150 comprises rendering a synchronized playback 192 of the output media file 150. A "graphical user interface," as used herein, is a graphical form of user interface that allows users to interact with electronic devices. In some embodiments, GUI 190 may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface 190. For example, links to decentralized platforms as described in this disclosure may be incorporated using icons. Using an icon may be a fast way to open documents, run programs etc. because clicking on them yields instant access.

With continued reference to FIG. 1, in an embodiment, the graphical user interface 190 and an event handler may operate together to enable seamless interaction between the user and the apparatus 100. The GUI 190 serves as the visual and interactive layer through which the user engages with the apparatus 100, presenting elements such as buttons, sliders, input fields, and informational displays. The event handler, on the other hand, functions as the underlying mechanism that monitors and responds to user interactions with the GUI 190. For example, when a user clicks a button on the GUI 190 to request an explanation of a concept, the event handler may detect the click event, identify its context, and trigger the appropriate processes within the apparatus 100 to generate a tailored response. This interplay may ensure dynamic and responsive system behavior, as the event handler processes various input events such as clicks, taps, keystrokes, or voice commands, and relays these inputs to the relevant system components. The GUI 190 subsequently updates to reflect the system's responses, such as displaying output, modifying visual elements, or providing real-time feedback. Together, the GUI 190 and event handler create an intuitive and interactive experience, bridging user actions and system functionality to achieve efficient and personalized outcomes.

With continued reference to FIG. 1, an "event handler," as used in this disclosure, is a module, data structure, function, and/or routine that performs an action in response to an event. For instance, and without limitation, an event handler may record data corresponding to user selections of previously populated fields such as drop-down lists and/or text auto-complete and/or default entries, data corresponding to user selections of checkboxes, radio buttons, or the like, potentially along with automatically entered data triggered by such selections, user entry of textual data using a keyboard, touchscreen, speech-to-text program, or the like. Event handler may generate prompts for further information, may compare data to validation rules such as requirements that the data in question be entered within certain numerical ranges, and/or may modify data and/or generate warnings to a user in response to such requirements.

With continued reference to FIG. 1, as used in this disclosure, a "visual element" is a component or feature within a system, display, or interface that conveys information through visual means. In a non-limiting example, the visual element may include text, images, icons, shapes, colors, and/or other graphical components designed to be perceived by the user. In a non-limiting example, the visual element may aid in communication, navigation, and/or interaction with the system. Without limitation, the visual element may be used to enhance user experience, guide behavior, and/or represent data visually in an intuitive or informative way. A visual element may include data transmitted to display device, client device, and/or graphical user interface 190. In some embodiments, visual element may be interacted with. For example, visual element may include an interface, such as a button or menu. In some embodiments, visual element may be interacted with using a user device such as a smartphone, tablet, smartwatch, or computer.

With continued reference to FIG. 1, in an embodiment, the apparatus 100 and or the downstream device 188 may include a data structure. As used in this disclosure, "data structure" is a way of organizing data represented in a specialized format on a computer configured such that the information can be effectively presented in a graphical user interface 190. In some cases, the data structure includes any input data 124. In some cases, the data structure contains data and/or rules used to visualize the graphical elements within a graphical user interface 190. In some cases, the data structure may include any data described in this disclosure. In some cases, the data structure may be configured to modify the graphical user interface 190, wherein data within the data structure may be represented visually by the graphical user interface 190. In some cases, the data structure may be continuously modified and/or updated by processor 102, wherein elements within graphical user interface 190 may be modified as a result. In some cases, processor 102 may be configured to transmit display device and or the downstream device 188 the data structure. Transmitting may include, and without limitation, transmitting using a wired or wireless connection, direct, or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio, and microwave data and/or signals, combinations thereof, and the like, among others. Processor 102 may transmit the data described above to a database wherein the data may be accessed from the database. Processor 102 may further transmit the data above to a display device, client device, or another computing device. The data structure may serve as the organizational framework that stores, retrieves, and manages data required for processing events and updating the GUI 190. The data structure may act as a bridge between the user's input, captured by the event handler, and the output displayed on the GUI 190, ensuring that information is handled efficiently and accurately throughout the interaction. For example, without limitation, when a user interacts with a dropdown menu in the GUI 190 to select a topic, the event handler may capture this input and accesses a data structure. The data structure may retrieve the relevant information such as, text explanations, videos, or interactive exercises, and passes it back to the event handler, which may then trigger the appropriate updates to the GUI 190. In another embodiment, the data structure may also maintain the state of the system, tracking user progress, preferences, and session history. For instance, without limitation, a hash table may store user specific configurations which the event handler references when processing interactions. The GUI 190 may then dynamically adapt to display content aligned with these configurations. This integration may ensure that user inputs are seamlessly translated into meaningful system outputs, with the data structure enabling rapid access, consistency, and scalability throughout the process. As used in this disclosure, a "hash table" is a data structure that stores data in a way that allows for fast retrieval, insertion, and deletion of elements. The hash table may organize data into key-value pairs, where each key is unique and used to identify its corresponding value. A hash table may use a hash function to compute an index, or hash code, from the key, which determines where the key-value pair is stored within an array or list.

With continued reference to FIG. 1, as used in this disclosure, an "interactive element" is a component or feature within a graphical user interface 190 that allows users to perform actions, provide input, or engage with the apparatus 100. Interactive elements may be designed to facilitate two-way communication between the user and the system, enabling the user to influence the behavior of the apparatus 100 or obtain feedback in response to their actions. Examples of interactive elements may include buttons, dropdown menus, sliders, checkboxes, input fields, and hyperlinks. More advanced interactive elements may include drag-and-drop interfaces, interactive diagrams, or dynamically updating content areas that respond to user actions in real time. The interactive elements may enhance user engagement by providing intuitive and responsive mechanisms for interacting with the system. Interactive elements may operate by responding to user actions such as clicks, taps, swipes, or keyboard inputs, and triggering predefined system behaviors or processes. The execution of the interactive elements may require a combination of front-end and back-end technologies that work together to provide seamless functionality and user interaction. On the front end, technologies such as HTML and CSS may define the structure, appearance, and layout of the interactive elements, while JavaScript may enable dynamic functionality. For example, without limitation, JavaScript may detect when the user clicks a button and trigger actions or animations. Front-end frameworks like React, Angular, or Vue.js may further enhance development by offering reusable components and efficient rendering mechanisms. On the back end, the system may process the user's input, retrieve the necessary data, and communicate with the front end to provide an appropriate response. APIs may act as a bridge between the front end and back end, facilitating data transfer, such as sending a user's form submission to the server and retrieving processed results. Server-side logic, implemented using languages like Python, Java, or Node.js, may handle input processing and return relevant data. Additional supporting technologies may ensure the smooth operation of interactive elements. Event listeners, for instance, may continuously monitor for specific actions like mouse clicks or text entries, executing code when such events are detected. Efficient data structures, such as hash tables or dictionaries, may store interactive state data, such as user preferences or settings, for quick access and updates. Databases, including MySQL or MongoDB, may manage and store the data required for interactive features, such as user profiles or historical activity. Communication technologies may also help maintain the responsiveness of interactive elements. AJAX (Asynchronous Javascript and XML) may allow the front end to update portions of a web page without requiring a full page reload, enhancing responsiveness. WebSockets may provide real-time interaction capabilities, such as live chats or collaborative tools, by enabling persistent communication between the client and the server. Without limitation, the apparatus 100 may include one or more APIs. As used in this disclosure, an "application programming interface (API)" is a set of defined protocols, tools, and methods that allow different software applications, systems, or components to communicate and interact with each other. An API may act as an intermediary that enables a client application, such as a user-facing app, to send requests to a server or service and receive the necessary responses, facilitating seamless integration and functionality across diverse systems.

With continued reference to FIG. 1, as used in this disclosure, "synchronized playback" is information representing the coordinated rendering of multiple media components such that each component is presented in temporal alignment according to a shared timeline. Without limitation, the synchronized playback 192 may include audio, video, subtitles, metadata, and the like. In an embodiment, synchronized playback 192 may ensure that the audio from the key audio source 134 is rendered concurrently with the corresponding video frames, visual transitions, and any associated on-screen elements such as speaker labels or graphical overlays. For example, without limitation, when a speaker begins talking, their voice may be played simultaneously with a close-up camera view and a name caption appearing in real time. Synchronized playback 192 may be managed by a media engine or playback framework that references timecodes or metadata to maintain alignment, even during buffering, seeking, or dynamic content adaptation.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

Figure 2:
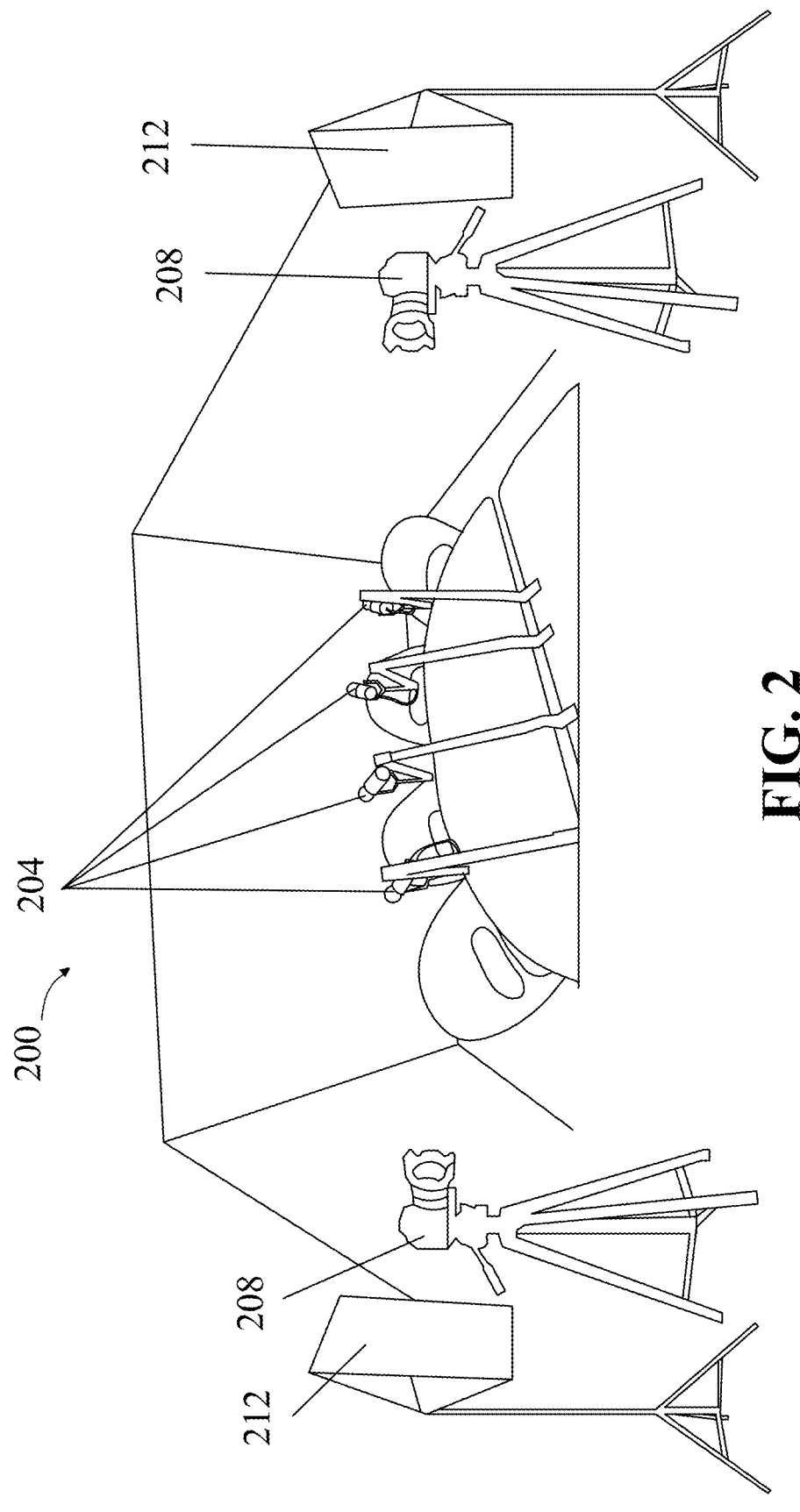
FIG. 2 is an exemplary illustration of an apparatus for generating an output media file as a function of determining a key audio source.

Referring now to FIG. 2, an exemplary illustration 200 of the apparatus for generating an output media file as a function of determining a key audio source. In an embodiment, the illustration 200 may include at least an audio input device 204. The at least an audio input device 204 may be the same or substantially similar as the at least an audio input device as described in FIG. 1. In an embodiment, the at least an audio input device 204 may be configured to detect at least an audio signal and convert the at least an audio signal into an electronic signal.

With continued reference to FIG. 2, in an embodiment, the illustration 200 may include at least an image capturing device 208. The at least an image capturing device 208 may be the same or substantially similar as the at least an image capturing device as described in FIG. 1. In an embodiment, the at least an image capturing device may be configured to record visual data and generate a digital representation of the visual data. In a non-limiting example, the image capturing device 208 may comprise a high-definition webcam integrated with a computing device, such as a laptop or desktop computer, suitable for solo podcast hosts streaming from a home studio. In a non-limiting example, the image capturing device 208 may comprise a standalone DSLR or mirrorless camera connected to the system via a video capture card or HDMI-to-USB interface, enabling higher-resolution visual data capture for professional-grade podcast productions. In a non-limiting example, the image capturing device 208 may comprise a PTZ (pan-tilt-zoom) camera configured to automatically track a speaker's movement or adjust framing during multi-person podcast interviews. In a non-limiting example, the image capturing device 208 may comprise a smartphone or tablet camera mounted on a tripod or gimbal, and communicatively connected to the podcasting apparatus via a wireless interface or app integration. In a non-limiting example, the image capturing device 208 may include a dual-camera system, wherein one camera is configured for wide-angle room capture such as, ambient background or behind-the-scenes shots, while the other focuses on facial expressions or close-ups of a host or guest. In a non-limiting example, the image capturing device 208 may include a depth-sensing camera or infrared imaging device configured to support low-light podcasting environments or produce background segmentation and virtual effects such as, bokeh, overlays, or branded backgrounds. In a non-limiting example, the image capturing device 208 may include a 360-degree camera configured to record immersive podcast environments, allowing listeners and viewers to interactively pan or explore the recording space. In a non-limiting example, the image capturing device 208 may include a thermal imaging camera configured for experimental podcast formats involving live biometric feedback or artistic thermal overlays. Each image capturing device 208 may be selected, activated, or synchronized with other podcasting components via a control interface or automation logic.

With continued reference to FIG. 2, in an embodiment, the illustration 200 may include at least a light source 212. In an embodiment, the at least a light source 212 may be configured to illuminate a target area within a field of view of the at least an image capturing device 208. In an embodiment, the at least a light source 212 may enhance the clarity, contrast, or visibility of the recorded visual data, particularly in low-light or variable lighting conditions. In a non-limiting example, the at least a light source 212 may comprise an LED ring light positioned around a webcam or DSLR camera lens. This may provide soft, even facial illumination for podcast hosts or guests during video recordings or livestreams, improving visual quality and reducing unflattering shadows, especially in home studio setups. In a non-limiting example, the at least a light source 212 may comprise a color-adjustable key light configured to simulate daylight or warmer tones. The user may modify the color temperature based on ambient lighting or aesthetic preferences to maintain consistent branding and a professional look across multiple podcast episodes or seasons. In a non-limiting example, the at least a light source 212 may be configured to synchronize with recording start/stop events. For instance, without limitation, the light may glow white while the system is idle and shift to red when the podcast is actively recording, serving as a real-time visual cue to minimize disruptions and signal live status to on-camera participants. In a non-limiting example, the at least a light source 212 may comprise a softbox-style directional light mounted off-camera to softly light the host or guest from a flattering angle. This may reduce facial shadows and create a cinematic look, enhancing the professional appearance of the podcast for visual platforms such as YouTube or Spotify Video. In a non-limiting example, the at least a light source 212 may comprise a background lighting strip or color LED panel, positioned behind the speaker to create depth or mood. The processor may allow dynamic lighting effects (e.g., pulsing or hue shifts) that reflect podcast themes, transitions, or music cues for a more immersive viewer experience. In a non-limiting example, the at least a light source 212 may be configured to adapt brightness in real-time based on the speaker's proximity, using data from a depth-sensing camera or infrared sensor to ensure consistent lighting regardless of minor host movements during recording. In a non-limiting example, the at least a light source 212 may be coupled to an AI-based scene detection model, where lighting conditions adjust based on whether the podcast is in solo-host mode, interview mode, or panel mode, optimizing facial clarity and focus for each participant.

Figure 3:
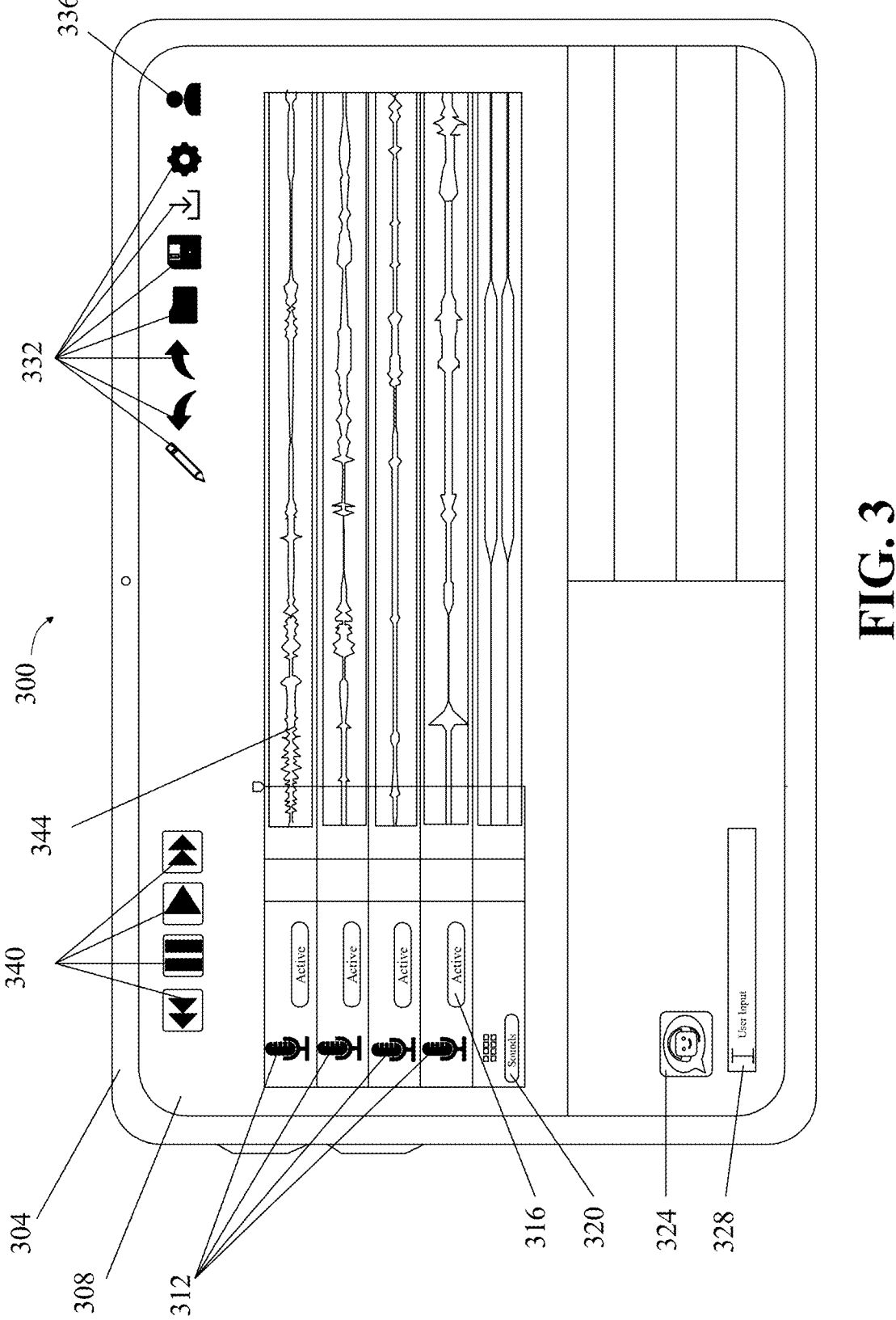
FIG. 3 is an exemplary illustration of a graphical user interface.

Referring now to FIG. 3, an exemplary illustration 300 of a graphical user interface. In an embodiment, the illustration 300 includes a downstream device 304. In an embodiment, the downstream device 304 may include a graphical user interface 308. In an embodiment, the graphical user interface 308 may include a visual representation of the at least an audio input device 312. Without limitation, the visual representation of the at least an audio input device 312 may comprise a microphone icon positioned within a recording panel of the GUI. The icon may be configured to indicate the recording status of the audio input device 312, such as displaying a red glow or pulse animation when the device is actively recording audio, or a muted grayscale appearance when the device is disabled or inactive. In a non-limiting example, the visual representation may include a real-time audio level meter adjacent to or integrated within the microphone icon, where dynamic visual bars reflect the amplitude of the captured audio signal to provide users with immediate feedback regarding input volume or gain. In a non-limiting example, the visual representation may include a selectable microphone dropdown menu, operable to switch between multiple available audio input devices like internal mic, USB mic, wireless lavalier. In a non-limiting example, the visual representation may include a contextual tooltip or overlay displaying the name, connection status, or technical specifications such as, sample rate, bit depth, of the selected audio input device. In a non-limiting example, the visual representation may include a lock icon or padlock overlay indicating that the selected microphone is fixed or unavailable for switching during an active recording session. In a non-limiting example, the visual representation may incorporate a touch-responsive or clickable region that, upon user interaction, opens a modal or settings interface for configuring the microphone's gain, input sensitivity, or noise suppression options. In a non-limiting example, the microphone visual may be animated to reflect voice activity detection, such as waveform pulsations or voice-triggered visual effects that reinforce real-time audio engagement. The visual representation of the at least an audio input device 312 may be positioned in proximity to other media control elements within the GUI, such as a play button, pause control, or waveform visualization panel.

With continued reference to FIG. 3, in an embodiment, the graphical user interface 308 may include a status bar 316. Without limitation, the status bar 316 may provide the status of the at least an audio input device. In a non-limiting example, the status bar 316 may display a live textual indicator such as "Recording," "Muted," "Mic Active," or "No Input Detected" to inform the user of the operational state of the audio input device. In a non-limiting example, the status bar 316 may further include a visual element, such as a color-coded indicator, like green for active input, red for muted, and gray for disconnected, configured to provide an at-a-glance understanding of microphone readiness. In a non-limiting example, the status bar 316 may include real-time decibel level readings or a gain meter reflecting the incoming audio signal strength from the at least an audio input device, enabling the user to adjust recording volume appropriately. In a non-limiting example, the status bar 316 may include an animated waveform strip or pulsing light to visually confirm that audio is being captured during recording. In a non-limiting example, the status bar 316 may include a timer indicating elapsed or remaining recording time, synchronized with the operation of the audio input device, to help users manage session duration. In a non-limiting example, the status bar 316 may display a message or icon if the system detects a change in audio input configuration (e.g., switching to a different microphone or disconnecting the current device), and may optionally prompt the user to confirm or reconfigure settings. In a non-limiting example, the status bar 316 may be interactive, allowing users to tap or click to open advanced settings for the audio input device, including options for noise cancellation, input device switching, or calibration. The status bar 316 may be persistently displayed during podcast recording sessions or dynamically shown or hidden based on user preference, screen layout, or device resolution.

With continued reference to FIG. 3, in an embodiment, the graphical user interface 308 may include a sound integration feature 320. In a non-limiting example, the sound integration feature 320 may be configured to enable a user or a virtual director to insert, manage, and edit supplemental audio content within a podcast episode. Without limitation, the sound integration feature 320 may include a user interface panel that allows selection and placement of music tracks, sound effects, ambient audio, or transitional jingles along a visual timeline. The feature 320 may support drag-and-drop functionality for importing audio clips from a local library, cloud storage, or preconfigured sound banks. In a non-limiting example, the sound integration feature 320 may include audio layer controls configured to allow the user to adjust volume levels, apply fade-in/fade-out effects, or set loop points for background music. In a non-limiting example, the sound integration feature 320 may enable automated sound placement by a virtual director module, wherein the system analyzes the structure of the spoken content and dynamically inserts predefined sounds at logical breakpoints, such as segment transitions, topic shifts, or moments of emphasis. In a non-limiting example, the sound integration feature 320 may include a preview button or real-time playback capability, enabling the user to hear how the inserted audio aligns with recorded voice tracks before finalizing the edits. In a non-limiting example, the sound integration feature 320 may allow tagging or categorization of audio assets such as "Intro," "Ad Break," "Reaction Sound," "Outro", and may support saving reusable templates for consistent branding across episodes. In a non-limiting example, the sound integration feature 320 may include compatibility with third-party digital audio workstations (DAWs) or libraries, and may also support automatic audio normalization to ensure sound effects and music are balanced relative to the spoken word. In a non-limiting example, the feature 320 may include licensing metadata for each integrated audio file to facilitate rights management and attribution for music or effects used in the production. The sound integration feature 320 may be displayed as a collapsible audio layer panel beneath the primary waveform timeline in the graphical user interface 308, or as a standalone module operable in split-screen or overlay mode.

With continued reference to FIG. 3, in an embodiment, the graphical user interface 308 may include a chatbot 324. The chatbot 324 may occupy a collapsible text panel or floating icon that expands into a conversational window, and may be configured to assist a podcast host, co-host, or producer throughout the pre-production, recording, and post-production phases of an episode. The chatbot 324 may provide real-time script suggestions or talking-point prompts based on a running transcript of the live conversation, thereby helping the host maintain narrative flow, insert sponsor messages at predefined timestamps, or pivot smoothly between segments. It may retrieve up-to-date reference information, such as guest biographies, statistics, or news headlines, so that the host can verify facts or cite sources while on air. The chatbot 324 may automatically generate concise episode summaries, chapter titles, and social-media snippets by analyzing the recorded dialogue, and may present these draft assets in the chat window for quick approval or editing. During post-production, the chatbot 324 may surface segments containing filler words, long pauses, or overlapping speech and may suggest precise cut points, enabling faster cleanup without requiring manual timeline scrubbing. The chatbot 324 may also monitor real-time audience questions during live-streamed recordings, consolidate recurring themes, and surface the most relevant inquiries to the host for on-air responses. Integrated sentiment analysis may highlight emotionally charged moments, allowing the production team to decide whether to amplify or moderate those sections in the final edit. The chatbot 324 may further streamline compliance by flagging potential trademark or copyright concerns in ad-reads or music beds, and may display licensing guidance within the same interface. Finally, the chatbot 324 may interface with the sound-integration feature 320 and status bar 316, enabling voice or text commands such as "lower intro music by three decibels," "mute microphone two," or "insert applause effect at the current marker," thereby serving as an intelligent assistant that unifies creative, technical, and administrative podcast tasks in a single conversational layer.

With continued reference to FIG. 3, in an embodiment, the graphical user interface 308 may include a user input field 328. In a non-limiting example, the user input field 328 may be configured to receive text-based input from a host, producer, or guest for various purposes throughout the podcast production and editing workflow. Without limitation, the user input field 328 may be used to manually enter episode titles, segment descriptions, timestamps, metadata tags, or show notes that are associated with a podcast recording. In a non-limiting example, the user input field 328 may allow the host to type ad copy or script prompts during a live or pre-recorded session. In a non-limiting example, the user input field 328 may be context-aware, dynamically adapting its function based on which component of the GUI is active, for instance, allowing the user to add a sound label when the sound integration feature 320 is in use, or enabling direct chat with the chatbot 324 when the conversational panel is open. In a non-limiting example, the user input field 328 may be coupled with autocomplete or natural language processing capabilities that provide suggestions based on commonly used podcast terms, prior user inputs, or episode-specific context. In a non-limiting example, the user input field 328 may also support shortcut commands, enabling users to enter simple keystrokes (e.g., "/insert jingle" or "/tag guest") that trigger automated actions or populate templated content. In a non-limiting example, the user input field 328 may support collaborative features, wherein multiple users connected to the same session may provide input simultaneously, such as a producer typing a note or cue for the host during live recording. In a non-limiting example, the user input field 328 may be integrated with real-time transcription data, allowing users to search, highlight, or comment on specific portions of the podcast dialogue for later editing or publishing decisions.

The user input field 328 may be rendered as a fixed or floating element within the GUI, and may expand, collapse, or relocate based on screen resolution, user preferences, or workflow context. In a non-limiting example, the user input field 328 may be configured to receive text-based input from a host, producer, guest, or listener, depending on the stage of the podcast production or playback process. Without limitation, the user input field 328 may be used to manually enter episode titles, segment notes, metadata, or annotations during recording and editing workflows. In a non-limiting example, the user input field 328 may be further configured to gather user feedback regarding the output media file. For instance, following the generation of an encoded podcast episode, the user input field 328 may allow listeners, collaborators, or reviewers to submit qualitative or structured feedback, such as comments about audio clarity, content pacing, segment transitions, or technical quality. The field may support open-ended text responses or preconfigured prompts such as "Rate this segment," "Suggest an edit," or "Flag an issue", and the feedback may be associated with specific timestamps in the media file for precise contextual review. In a non-limiting example, the user input field 328 may be integrated with the chatbot 324 or a backend analytics engine to summarize or prioritize the collected feedback for editorial decision-making. In a non-limiting example, feedback entered into the user input field 328 may be stored in association with the media file's unique identifier or metadata record, and used to refine future content, track listener preferences, or inform quality control metrics across podcast episodes. The user input field 328 may be rendered as a static element below a waveform visualization, embedded in a feedback sidebar, or deployed as a floating prompt following playback completion of the output media file.

With continued reference to FIG. 3, in an embodiment, the graphical user interface 308 may include a plurality of interactive features 332. In a non-limiting example, the plurality of interactive features 332 may include one or more user-selectable controls configured to facilitate content creation, editing, file management, and customization of the podcasting environment. Without limitation, the interactive features 332 may include an edit control, which may allow a user to trim, cut, split, or merge audio segments along a waveform timeline. In a non-limiting example, the interactive features 332 may include undo and redo controls, operable to reverse or reinstate previous user actions, such as reapplying a deleted audio clip or undoing a misaligned track movement. In a non-limiting example, the interactive features 332 may include an open file control, which may allow the user to import a previously recorded audio file, project file, or media asset into the current podcast workspace. In a non-limiting example, the interactive features 332 may include a save file control, configured to store the current working session, including timeline edits, audio layers, metadata, and configuration settings. In a non-limiting example, the interactive features 332 may include a download control, enabling the user to export an output media file in one or more file formats (e.g., .mp3, .wav, .m4a) for local storage, distribution, or syndication. The download control may optionally allow users to select encoding parameters such as bitrate or channel configuration. In a non-limiting example, the interactive features 332 may include a settings control, operable to launch a configuration panel where users may adjust preferences related to microphone input, audio output, visual theme, file paths, or integration with third-party platforms. In a non-limiting example, the interactive features 332 may include a zoom control for adjusting the scale of the waveform timeline, a marker control for placing bookmarks or annotations at specific timestamps, and a help icon or tooltips providing contextual guidance for each feature. The plurality of inter-active features 332 may be displayed in a toolbar, floating panel, or ribbon menu, and may be dynamically shown or hidden based on user roles, session phase (e.g., recording vs. editing), or interface layout preferences.

With continued reference to FIG. 3, in an embodiment, the graphical user interface 308 may include a user profile 336. In a non-limiting example, the user profile 336 may store and manage user-specific settings, preferences, and histori-cal data relevant to podcast or video creation. Without limitation, the user profile 336 may include saved prefer-ences such as preferred recording quality, default micro-phone input, interface theme, or workspace layout. In a non-limiting example, the user profile 336 may include a designation of content type, such as "interview-based pod-cast," "solo commentary," "news roundup," or "video pod-cast with visual overlays," which may influence how the system configures the recording template, preloads assets, or recommends sound design features. In a non-limiting example, the user profile 336 may contain stylistic prefer-ences for the final output media file, such as background music genres, sound effect libraries, intro/outro templates, or visual branding cues for video overlays. In a non-limiting example, the user profile 336 may further include usage history, such as past episodes, segment structures, or sound levels, which may be referenced by the virtual director to maintain consistency or automatically replicate frequently used structures. In a non-limiting example, the user profile 336 may store user-specific information for the virtual director, such as speaking cadence, preferred pacing, and episode length range, which may guide the automated place-ment of music beds, pauses, transitions, or dynamic cuts within the output media file. In a non-limiting example, the user profile 336 may include account-linked assets, such as a personal intro clip, a sponsor read template, or a custom outro jingle, all of which may be auto-inserted by the virtual director to streamline production. In a non-limiting example, the user profile 336 may be used to sync cross-device access, allowing a user to start editing a podcast on one device and resume on another with persistent preferences and project continuity. The user profile 336 may be presented in a dedicated panel, profile dropdown, or modal dialog, and may optionally include authentication features, subscription status, and cloud storage preferences.

With continued reference to FIG. 3, in an embodiment, the graphical user interface 308 may include one or more media control buttons 340. In a non-limiting example, the media control buttons 340 may be configured to facilitate playback, navigation, and recording functions during podcast creation, editing, or review. Without limitation, the media control buttons 340 may include a play button configured to initiate playback of a recorded or imported audio segment, a pause button to temporarily halt playback without losing the current timestamp, and a stop button to fully terminate playback or recording and reset the playback position. In a non-limiting example, the media control buttons 340 may include a record button configured to initiate or terminate real-time audio capture from one or more audio input devices, and may visually change state (e.g., from gray to red) to indicate an active recording session. In a non-limiting example, the media control buttons 340 may include rewind and fast-forward buttons, each operable to move the play-back cursor backward or forward by a predefined increment (e.g., 5 seconds, 30 seconds, or to the next marker). In a non-limiting example, the media control buttons 340 may include a skip button configured to jump between segments or speaker changes, based on structural markers embedded in the waveform. In a non-limiting example, the media control buttons 340 may include a loop button to continu-ously repeat a selected segment of the audio for fine-tuning edits or quality review. In a non-limiting example, the buttons may include an insert marker button, allowing the user to add a timestamped annotation or content flag during playback or recording. The media control buttons 340 may be dynamically rendered based on context—e.g., showing only playback-related controls during episode review, and showing recording-related controls during capture sessions. Each button may be accompanied by tooltips or iconography and may be keyboard-navigable for accessibility. Addition-ally, the media control buttons 340 may be linked to under-lying logic that coordinates with other GUI components, such as triggering the waveform visualization to animate in sync with playback, updating the status bar 316 to reflect active recording, or allowing the virtual director to insert transition audio cues based on user-controlled playback activity. In an embodiment, the graphical user interface 308 may include a waveform display 344. In a non-limiting example, the waveform display 344 may be configured to present a graphical representation of the amplitude of an audio signal over time, enabling users to visually navigate, edit, and analyze the recorded podcast content. The wave-form display 344 may dynamically render in real-time during active recording sessions and may be updated post-recording to reflect any edits, insertions, or overlays. In a non-limiting example, the waveform display 344 may include multiple stacked tracks or channels, such as separate waveforms for different speakers, background music, or inserted sound effects, allowing for layered editing and precise synchronization. The waveform display 344 may further include a playback cursor, configured to move along the timeline to indicate the current position during playback or scrubbing. In a non-limiting example, the waveform display 344 may allow users to zoom in and out, providing both macro and micro views for high-level structuring or fine-grained editing. In a non-limiting example, the wave-form display 344 may be annotated with time markers, segment dividers, or labeled sections, such as "Intro," "Inter-view Start," "Ad Break," or "Outro," enabling users to identify and access specific parts of the podcast with ease. In a non-limiting example, the waveform display 344 may support click-and-drag functionality to select, trim, split, or move portions of the waveform, and may provide snap-to-grid or auto-align tools to ensure seamless transitions between edits. In a non-limiting example, the waveform display 344 may include color coding or waveform styling, where different speakers, sound types like voice vs. music, or audio quality levels are visually distinguished. In some embodiments, the waveform display 344 may be synchro-nized with the status bar 316 and the media control buttons 340, allowing for responsive updates and real-time feedback during playback, recording, or editing. In a non-limiting example, the waveform display 344 may be integrated with transcription features, such that a corresponding text tran-script scrolls in alignment with the waveform. This enables users to interact with the podcast visually and textually, for editing, captioning, or summarization purposes.

Figure 4:
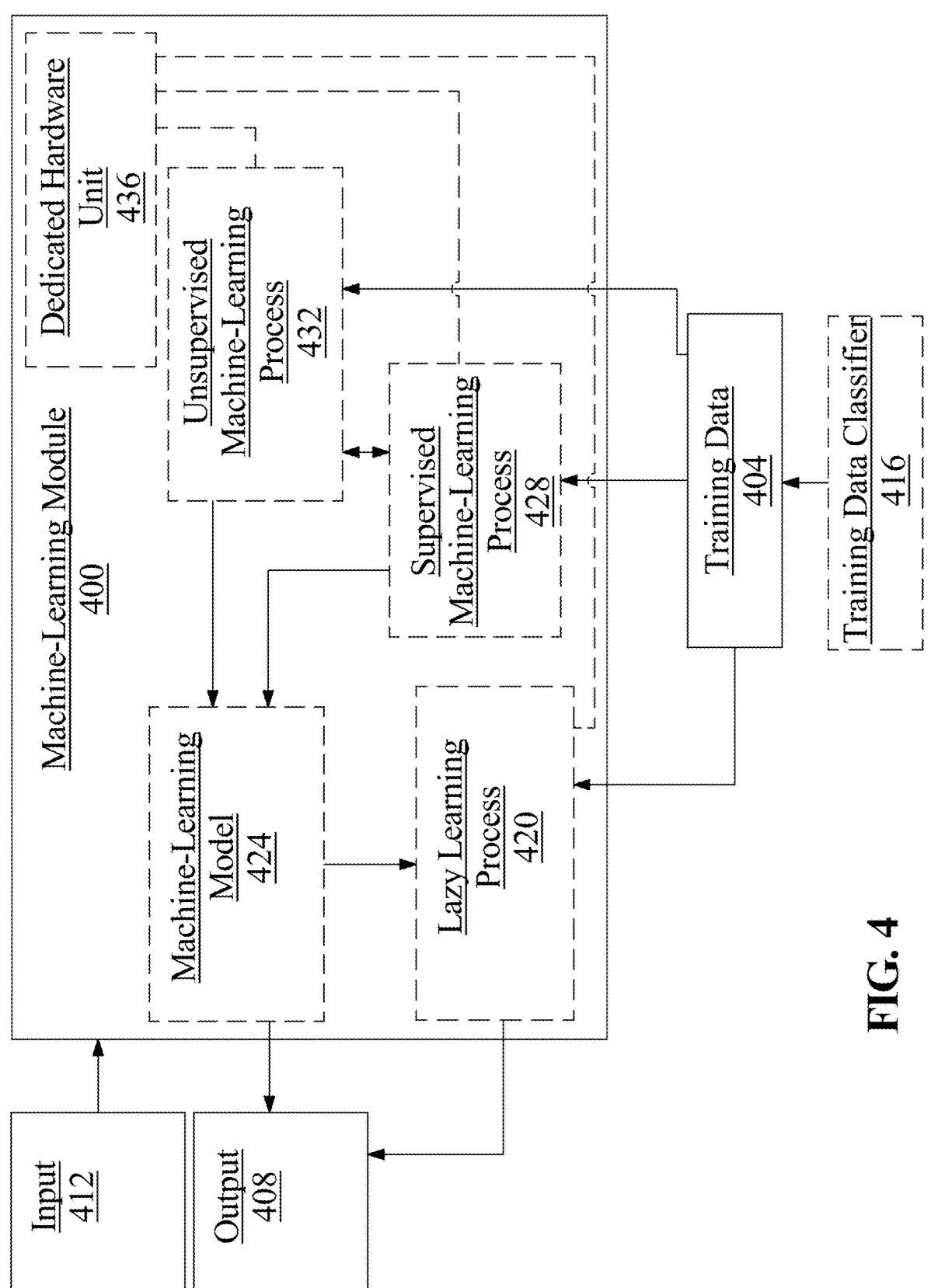
FIG. 4 is a block diagram of an exemplary machine-learning process.

Referring now to FIG. 4, an exemplary embodiment of a machine-learning module 400 that may perform one or more machine-learning processes as described in this disclosure is illustrated. Machine-learning module may perform determi-nations, classification, and/or analysis steps, methods, processes, or the like as described in this disclosure using machine learning processes. A "machine learning process," as used in this disclosure, is a process that automatedly uses training data 404 to generate an algorithm instantiated in hardware or software logic, data structures, and/or functions that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example the input data may include multimodal recordings comprising electronic audio signals from one or more engaged audio input devices, visual data from image capturing devices, contextual metadata derived from large language model analysis, and user profile preferences. The output data may include a classification of a key audio source, a selection of corresponding camera angles, a sequence of visual transitions, and a finalized output media file personalized for playback on a downstream device.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to subgroups of media sessions characterized by distinct speaker engagement patterns, such as high-participation interview segments, single-speaker monologues, or multi-speaker panel discussions, thereby enabling the selection of a subset of training data tailored to optimize key audio source identification for each session type.

Still referring to FIG. 4, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)÷P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 4, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 4, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 4, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 4, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 4, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 4, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 4, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 4, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 4, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 4, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max} : X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation $\sigma$ of a set or subset of values:

$$X_{new} = \frac{X - X_{mean}}{\sigma}.$$

Scaling may be performed using a median value of a a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include audio signals, visual frames, speaker identification tags, contextual metadata, and user profile parameters as described above as inputs, and corresponding key audio source labels, camera angle selections, and output media files as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

With further reference to FIG. 4, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 4, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 432 may not require a response variable; unsupervised processes 432 may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 4, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 4, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 4, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 4, one or more processes or algorithms described above may be performed by at least a dedicated hardware unit 436. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 436 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 436 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 436 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 5:
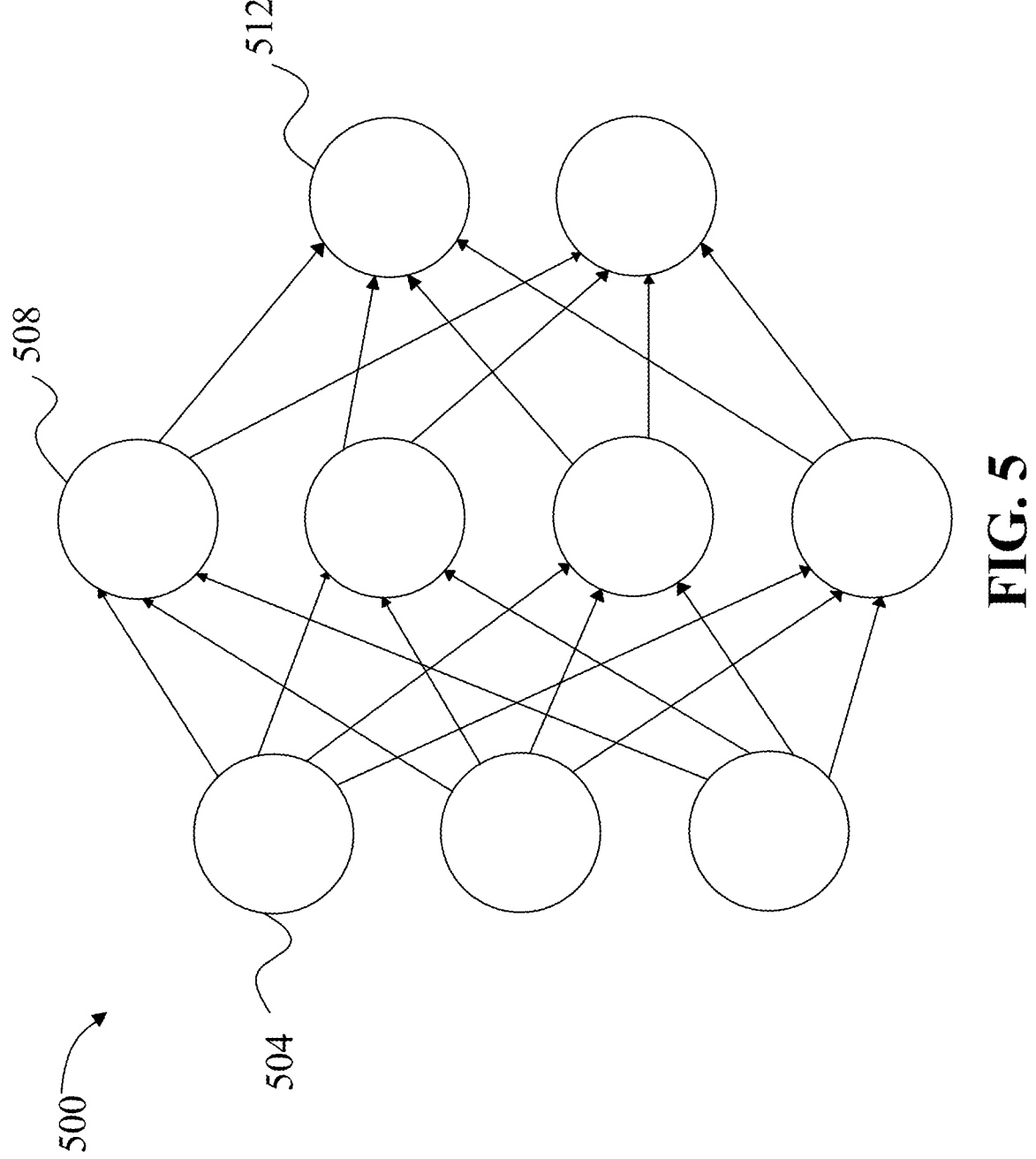
FIG. 5 is a diagram of an exemplary embodiment of a neural network.

Referring now to FIG. 5, an exemplary embodiment of neural network 500 is illustrated. A neural network 500 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 504, one or more intermediate layers 508, and an output layer of nodes 512. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 6:
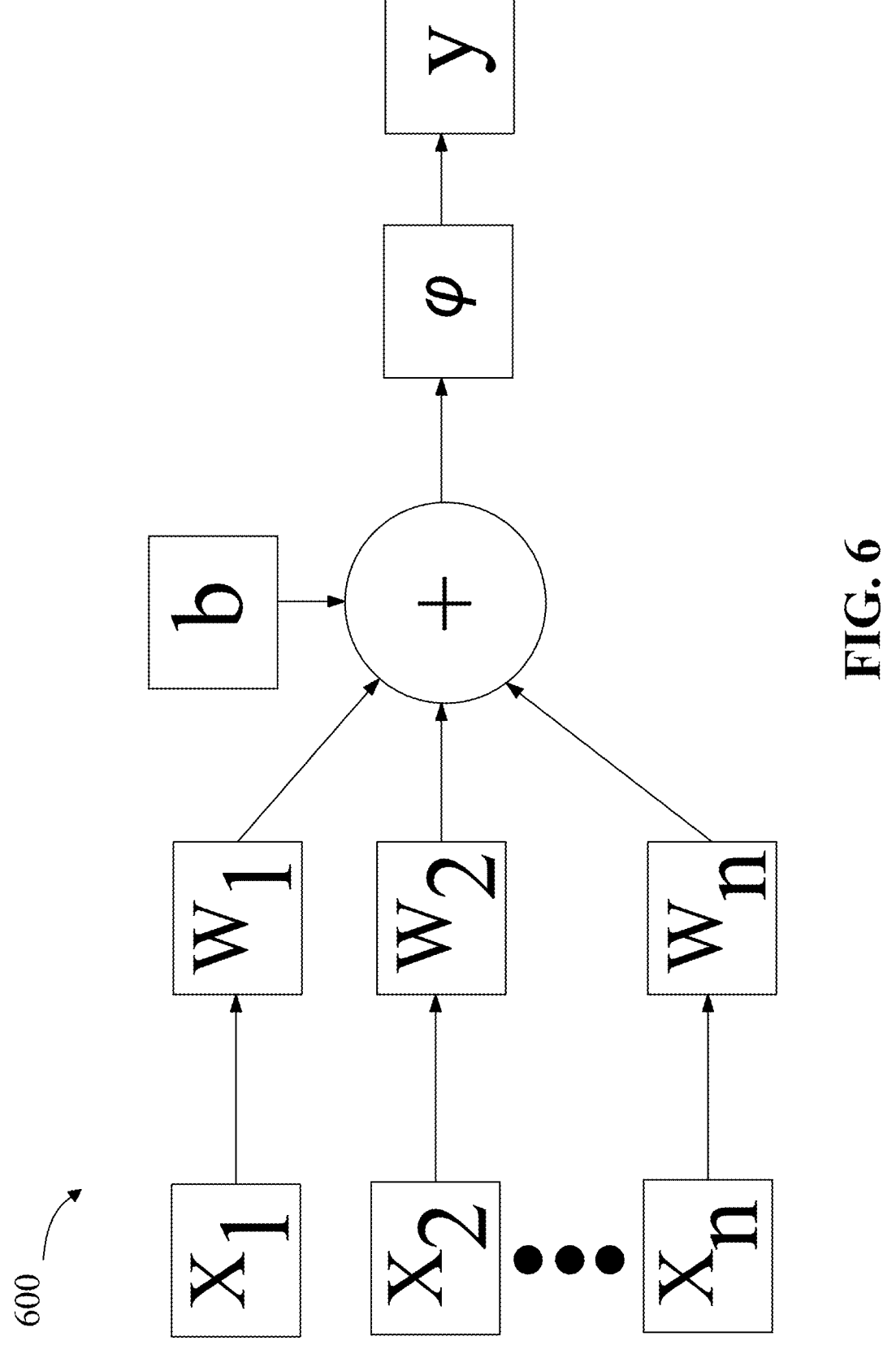
FIG. 6 is a diagram of an exemplary embodiment of a node of a neural network.

Referring now to FIG. 6, an exemplary embodiment of a node 600 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x) = \tanh^2(x)$, a rectified linear unit function such as $f(x) = \max(0, x)$, a "leaky" and/or "parametric" rectified linear unit function such as $f(x) = \max(ax, x)$ for some a, an exponential linear units function such as $$f(x) = \begin{cases} x & \text{for } x \geq 0 \\ \alpha(e^x - 1) & \text{for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x) = x * \text{sigmoid}(x)$, a Gaussian error linear unit function such as $f(x) = a(1 + \tanh(\sqrt{2/\pi}(x + bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 7:
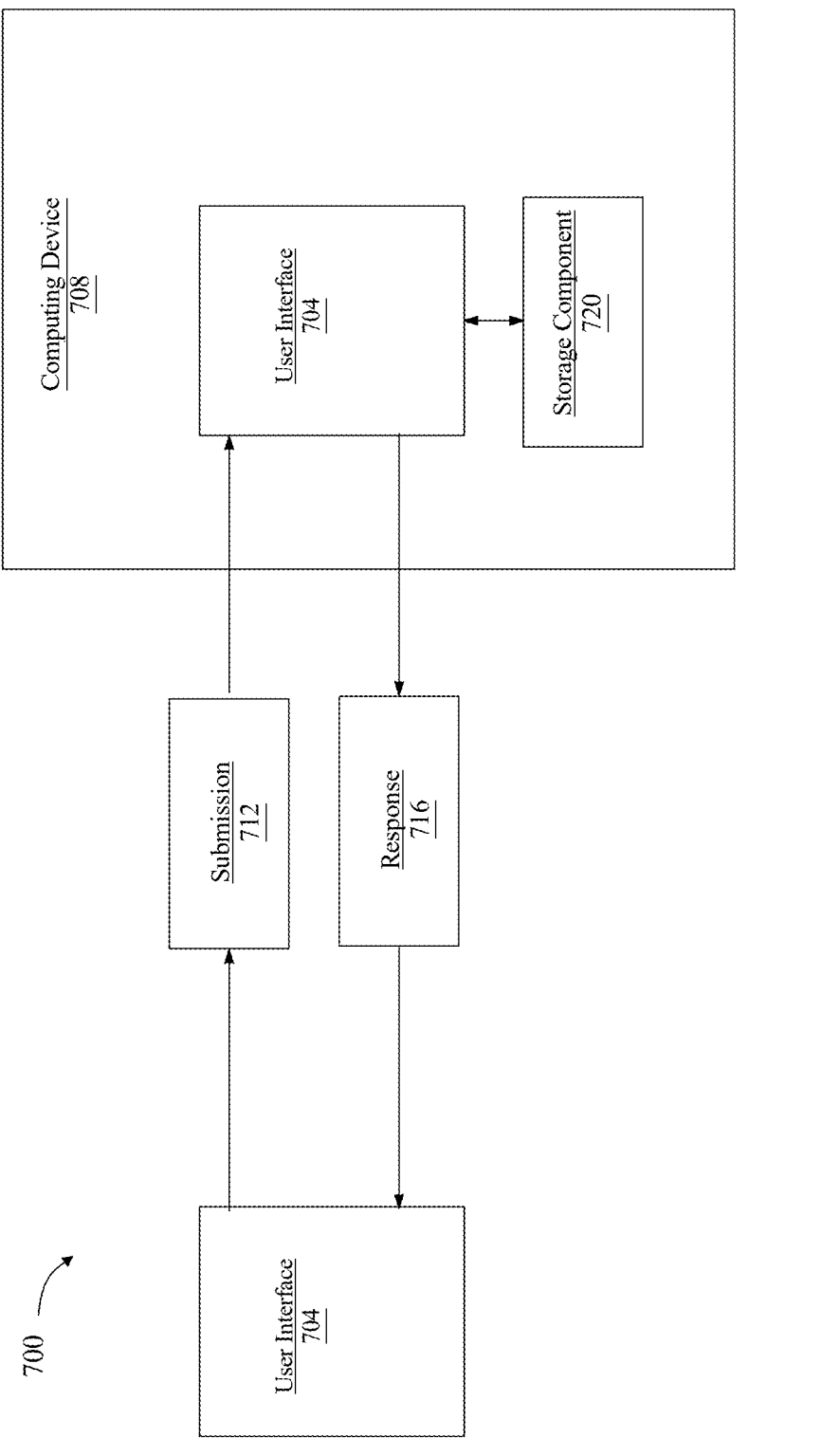
FIG. 7 is a diagram of an exemplary embodiment of a chatbot.

Referring to FIG. 7, a chatbot system 700 is schematically illustrated. According to some embodiments, a user interface 704 may be communicative with a computing device 708 that is configured to operate a chatbot. In some cases, user interface 704 may be local to computing device 708. Alternatively or additionally, in some cases, user interface 704 may remote to computing device 708 and communicative with the computing device 708, by way of one or more networks, such as without limitation the internet. Alternatively or additionally, user interface 704 may communicate with computing device 708 using telephonic devices and networks, such as without limitation fax machines, short message service (SMS), or multimedia message service (MMS). Commonly, user interface 704 communicates with computing device 708 using text-based communication, for example without limitation using a character encoding protocol, such as American Standard for Information Interchange (ASCII). Typically, a user interface 704 conversationally interfaces a chatbot, by way of at least a submission 712, from the user interface 704 to the chatbot, and a response 716, from the chatbot to the user interface 704. In many cases, one or both submission 712 and response 716 are text-based communication. Alternatively or additionally, in some cases, one or both of submission 712 and response 716 are audio-based communication.

Continuing in reference to FIG. 7, a submission 712 once received by computing device 708 operating a chatbot, may be processed by a processor 720. In some embodiments, processor 720 processes submission 712 using one or more of keyword recognition, pattern matching, and natural language processing. In some embodiments, processor employs real-time learning with evolutionary algorithms. In some cases, processor 720 may retrieve a pre-prepared response from at least a storage component 720, based upon submission 712. Alternatively or additionally, in some embodiments, processor 720 communicates a response 716 without first receiving a submission 712, thereby initiating conversation. In some cases, processor 720 communicates an inquiry to user interface 704; and the processor is configured to process an answer to the inquiry in a following submission 712 from the user interface 704. In some cases, an answer to an inquiry present within submission 712 from the computing device 708 may be used by computing device 708 as an input to another function.

Referring now to FIG. 8, a flow diagram of an exemplary method 800 for generating an output media file as a function of determining a key audio source is illustrated. At step 805, method 800 includes detecting, using at least an audio input device, at least an audio signal. This may be implemented as described and with reference to FIGS. 1-7.

Still referring to FIG. 8, at step 810, method 800 includes converting, using the at least an audio device, the at least an audio signal into an electronic signal. This may be implemented as described and with reference to FIGS. 1-7.

Still referring to FIG. 8, at step 815, method 800 includes identifying, using a first model, one or more engaged devices of the at least an audio input device based on sensor data. This may be implemented as described and with reference to FIGS. 1-7.

Still referring to FIG. 8, at step 820, method 800 includes receiving, using at least a processor communicatively connected to at least a computing device communicatively connected to the at least an audio input device and the at least an image capturing device, input data, wherein the input data comprises the at least an electronic signal from the one or more engaged devices and a corresponding digital representation. In an embodiment, the input data further may include a digital document. This may be implemented as described and with reference to FIGS. 1-7.

Still referring to FIG. 8, at step 825, method 800 includes filtering, using the at least a processor, the input data based on a signal level and a context datum of the at least an electronic signal. This may be implemented as described and with reference to FIGS. 1-7.

Still referring to FIG. 8, at step 830, method 800 includes determining, using a second model, a key audio source as a function of the one or more engaged devices and the filtered input data. In an embodiment, the at least a processor may be further configured to train the second model using training dataset, wherein the training dataset comprises a plurality of multimodal data corresponding to a plurality of identified key audio sources. In an embodiment, the at least a processor may be further configured to retrain the second model using user feedback, wherein the user feedback comprises at least an identification of a confirmed key audio source. This may be implemented as described and with reference to FIGS. 1-7.

Still referring to FIG. 8, at step 835, method 800 includes generating, using a virtual director, an output media file as a function of the key audio source. In an embodiment, the at least a processor may be further configured to train the virtual director using director training data, wherein the director training data comprises historical multimedia files associated with historical output media files. In an embodiment, the virtual director may be further configured to generate the output media file by analyzing, using a large language model, the at least an electronic signal of the input data to identify one or more contextual cues, wherein analyzing comprises parsing the at least an electronic signal to identify semantic meaning, detecting linguistic features, and classifying segments of the at least an electronic signal to generate the context datum for downstream processing, selecting, based on the one or more contextual cues, an angle of the at least an image capturing device corresponding to a target view, and generating, as a function of the selection, a sequence of visual transitions for the output media file. In an embodiment, the virtual director may be further configured to analyze the director training data, wherein the director training data comprises synchronized historical multimedia files, wherein analyzing the director training data comprises identifying patterns associated with non-verbal contextual events, determine, using one or more rule-based logic operations, whether the key audio source corresponds to a secondary event, and select, based on the one or more rule-based logic operations, an alternate camera angle when the secondary event satisfies a predefined switching condition. In an embodiment, the at least a processor may be further configured to personalize the output media file based on user profile data, wherein personalizing the output media file comprises modifying the one or more visual transitions based on a viewing preference within the user profile data. This may be implemented as described and with reference to FIGS. 1-7.

Still referring to FIG. 8, at step 840, method 800 includes presenting, using a downstream device, the output media file. In an embodiment, the apparatus may further include recording, using at least an image capturing device communicatively connected to the at least a processor, visual data and generating, using the at least an image capturing device, a digital representation of the visual data. In an embodiment, the at least a processor may be further configured to display, using a graphical user interface of the downstream device, the output media file, wherein displaying the output media file comprises rendering a synchronized playback of processed input data. This may be implemented as described and with reference to FIGS. 1-7.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
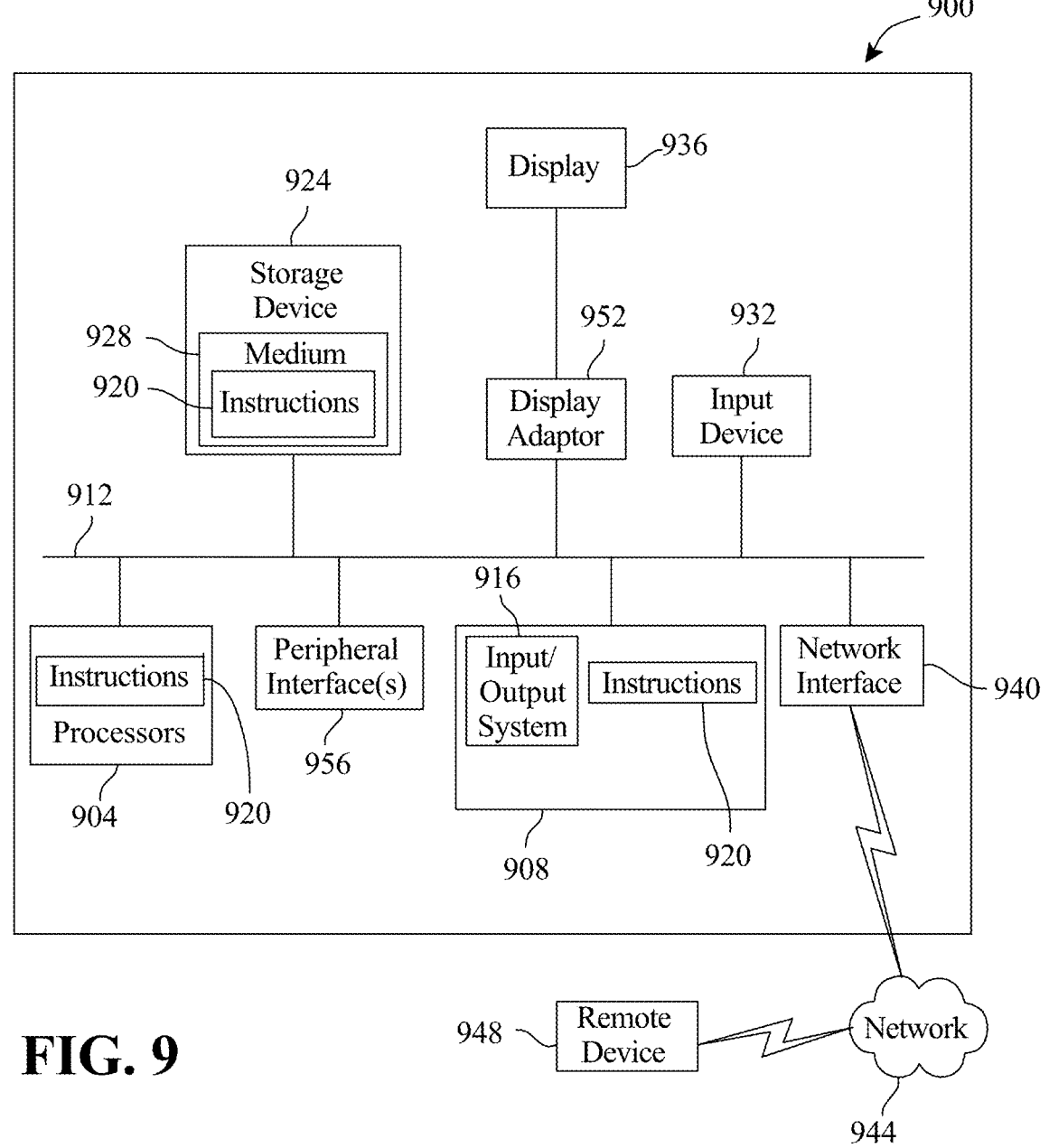
FIG. 9 is a block diagram of a computing system that can be used to implement any one or more of the methodologies disclosed herein and any one or more portions thereof.

FIG. 9 shows a diagrammatic representation of one embodiment of computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display device 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for generating an output media file as a function of determining a media source, wherein the apparatus comprises:
   at least an audio input device configured to:
      detect at least an audio signal; and
      convert the at least an audio signal into an electronic signal; and
   at least a computing device communicatively connected to the at least an audio input device, wherein the computing device comprises:
      a memory; and
      at least a processor communicatively connected to the memory, wherein the memory contains instructions configuring the at least a processor to:
         identify, using a first model, one or more engaged devices of the at least an audio input device based on sensor data;
         receive, using the at least a processor, input data, wherein the input data comprises the at least an electronic signal from the one or more engaged devices;
         filter, using the at least a processor, the input data based on a signal level and a context datum of the at least an electronic signal; and
         determine, using a second model, a key audio source as a function of the one or more engaged devices and the filtered input data;
         generate, using a virtual director, an output media file as a function of the key audio source; and
      present, using a downstream device, the output media file.

2. The apparatus of claim 1, wherein the at least a processor is further configured to train the second model using a training dataset, wherein the training dataset comprises a plurality of multimodal data corresponding to a plurality of identified key audio sources.

3. The apparatus of claim 1, further comprising recording, using at least an image capturing device communicatively connected to the at least a processor, visual data and generating, using the at least an image capturing device, a digital representation of the visual data.

4. The apparatus of claim 3, wherein generating, using the virtual director the output media file further comprises:
   analyzing, using a large language model, the at least an electronic signal of the input data to identify one or more contextual cues, wherein analyzing the at least an electronic signal comprises:
   parsing the at least an electronic signal to identify semantic meaning;
   detecting linguistic features; and
   classifying segments of the at least an electronic signal to a plurality of categories to generate the context datum for downstream processing;
   selecting, based on the one or more contextual cues, an angle of the at least an image capturing device corresponding to a target view; and
   generating, as a function of a selection, a sequence of visual transitions for the output media file.

5. The apparatus of claim 4, wherein the at least a processor is further configured to personalize the output media file based on user profile data, wherein personalizing the output media file comprises modifying the sequence of visual transitions based on a viewing preference within the user profile data.

6. The apparatus of claim 1, wherein the input data further comprises a digital document.

7. The apparatus of claim 1, wherein the at least a processor is further configured to display, using a graphical user interface of the downstream device, the output media file, wherein displaying the output media file comprises rendering a synchronized playback of the output media file.

8. The apparatus of claim 1, wherein the at least a processor is further configured to train the virtual director using director training data, wherein the director training data comprises historical multimedia files associated with historical output media files.

9. The apparatus of claim 8, wherein the virtual director is further configured to:

analyze the director training data, wherein the director training data comprises synchronized historical multimedia files, wherein analyzing the director training data comprises identifying patterns associated with non-verbal contextual events;

determine, using one or more rule-based logic operations, whether the key audio source corresponds to a secondary event; and select, based on the one or more rule-based logic operations, an alternate camera angle when the secondary event satisfies a predefined switching condition.

10. The apparatus of claim 1, wherein the at least a processor is further configured to retrain the second model using user feedback, wherein the user feedback comprises at least an identification of a confirmed key audio source.

11. A method for generating an output media file as a function of determining a media source, wherein the method comprises:

detecting, using at least an audio input device, at least an audio signal;

converting, using the at least an audio device, the at least an audio signal into an electronic signal;

identifying, using a first model, one or more engaged devices of the at least an audio input device based on sensor data;

receiving, using at least a processor communicatively connected to at least a computing device communicatively connected to the at least an audio input device and the at least an image capturing device, input data, wherein the input data comprises the at least an electronic signal from the one or more engaged devices and a corresponding digital representation;

filtering, using the at least a processor, the input data based on a signal level and a context datum of the at least an electronic signal; and determining, using a second model, a key audio source as a function of the one or more engaged devices and the filtered input data;

generating, using a virtual director, an output media file as a function of the key audio source; and presenting, using a downstream device, the output media file.

12. The method of claim 11, further comprising training, using the at least a processor, the second model using a training dataset, wherein the training dataset comprises a plurality of multimodal data corresponding to a plurality of identified key audio sources.

13. The method of claim 11, further comprising recording, using at least an image capturing device communicatively connected to the at least a processor, visual data and generating, using the at least an image capturing device, a digital representation of the visual data.

14. The method of claim 13, further comprising generating, using the virtual director, the output media file by:

analyzing, using a large language model, the at least an electronic signal of the input data to identify one or more contextual cues, wherein analyzing comprises:

parsing the at least an electronic signal to identify semantic meaning;

detecting linguistic features; and classifying segments of the at least an electronic signal to generate the context datum for downstream processing;

selecting, based on the one or more contextual cues, an angle of the at least an image capturing device corresponding to a target view; and generating, as a function of a selection, a sequence of visual transitions for the output media file.

15. The method of claim 14, further comprising personalizing, using the at least a processor, the output media file based on user profile data, wherein personalizing the output media file comprises modifying the sequence of visual transitions based on a viewing preference within the user profile data.

16. The method of claim 11, further comprising receiving, using the at least a processor, a digital document of the input data.

17. The method of claim 11, further comprising displaying, using a graphical user interface of the downstream device, the output media file, wherein displaying the output media file comprises rendering a synchronized playback of the output media file.

18. The method of claim 11, further comprising training, using the at least a processor, the virtual director using director training data, wherein the director training data comprises historical multimedia files associated with historical output media files.

19. The method of claim 18, further comprising:

analyzing, using the virtual director, the director training data, wherein the director training data comprises synchronized historical multimedia files, wherein analyzing the director training data comprises identifying patterns associated with non-verbal contextual events;

determining, using one or more rule-based logic operations, whether the key audio source corresponds to a secondary event; and selecting, based on the one or more rule-based logic operations, an alternate camera angle when the secondary event satisfies a predefined switching condition.

20. The method of claim 11, further comprising retraining, using the at least a processor, the second model using user feedback, wherein the user feedback comprises at least an identification of a confirmed key audio source.

* * * * *